(12) United States Patent
Grochowski et al.

(10) Patent No.: US 9,477,467 B2
(45) Date of Patent: Oct. 25, 2016

(54) PROCESSORS, METHODS, AND SYSTEMS TO IMPLEMENT PARTIAL REGISTER ACCESSES WITH MASKED FULL REGISTER ACCESSES

(71) Applicant: Intel Corporation, Santa Clara, CA (US)

(72) Inventors: Edward T. Grochowski, San Jose, CA (US); Seyed Yahya Sotoudeh, San Jose, CA (US); Buford M. Guy, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 610 days.

(21) Appl. No.: 13/854,089

(22) Filed: Mar. 30, 2013

(65) Prior Publication Data

US 2014/0297994 A1 Oct. 2, 2014

(51) Int. Cl.
*G06F 15/76* (2006.01)
*G06F 15/00* (2006.01)
*G06F 9/30* (2006.01)

(52) U.S. Cl.
CPC ....... *G06F 9/30014* (2013.01); *G06F 9/30018* (2013.01); *G06F 9/30036* (2013.01)

(58) Field of Classification Search
None
See application file for complete search history.

(56) References Cited

U.S. PATENT DOCUMENTS

| | | | | |
|---|---|---|---|---|
| 6,092,094 A | * | 7/2000 | Ireton | G06F 7/48 708/706 |
| 6,122,725 A | * | 9/2000 | Roussel | G06F 9/30014 712/200 |
| 6,230,253 B1 | * | 5/2001 | Roussel | G06F 9/30014 712/208 |
| 6,334,183 B1 | | 12/2001 | Blomgren et al. | |
| 6,442,676 B1 | * | 8/2002 | Guenthner | G06F 9/30036 710/305 |
| 2012/0216011 A1 | | 8/2012 | Gove et al. | |

(Continued)

FOREIGN PATENT DOCUMENTS

| | | |
|---|---|---|
| CN | 1656444 A | 8/2005 |
| CN | 102841776 A | 12/2012 |

(Continued)

OTHER PUBLICATIONS

Combined Search and Examination Report received for United Kingdom Patent Application No. 1405413.4, mailed on Nov. 4, 2014, 7 pages.

(Continued)

*Primary Examiner* — Michael Sun
(74) *Attorney, Agent, or Firm* — Vecchia Patent Agent, LLC

(57) ABSTRACT

A method includes receiving a packed data instruction indicating a first narrower source packed data operand and a narrower destination operand. The instruction is mapped to a masked packed data operation indicating a first wider source packed data operand that is wider than and includes the first narrower source operand, and indicating a wider destination operand that is wider than and includes the narrower destination operand. A packed data operation mask is generated that includes a mask element for each corresponding result data element of a packed data result to be stored by the masked packed data operation. All mask elements that correspond to result data elements to be stored by the masked operation that would not be stored by the packed data instruction are masking out. The masked operation is performed using the packed data operation mask. The packed data result is stored in the wider destination operand.

26 Claims, 19 Drawing Sheets

(56) References Cited

U.S. PATENT DOCUMENTS

| | | | |
|---|---|---|---|
| 2012/0233443 A1 | 9/2012 | Sebot et al. | |
| 2012/0254588 A1 | 10/2012 | Adrian et al. | |
| 2012/0254592 A1 | 10/2012 | San Adrian et al. | |
| 2014/0016773 A1* | 1/2014 | Wolrich | G06F 21/72 380/28 |
| 2014/0040599 A1* | 2/2014 | Fleischer | G06F 9/30036 712/205 |
| 2014/0095842 A1* | 4/2014 | Caprioli | G06F 9/30036 712/222 |
| 2014/0189191 A1* | 7/2014 | Pardo | G06F 12/0802 711/3 |
| 2014/0215186 A1* | 7/2014 | Ould-Ahmed-Vall | G06F 9/30145 712/205 |
| 2015/0006858 A1* | 1/2015 | Toll | G06F 9/30018 712/208 |
| 2015/0006865 A1* | 1/2015 | Toll | G06F 9/30014 712/229 |
| 2015/0261534 A1* | 9/2015 | Uliel | G06F 9/30145 712/208 |

FOREIGN PATENT DOCUMENTS

| | | |
|---|---|---|
| KR | 10-0940957 B1 | 1/2010 |
| WO | 99/50740 A1 | 10/1999 |
| WO | 9950740 A1 | 10/1999 |
| WO | 2012/135494 A2 | 10/2012 |

OTHER PUBLICATIONS

Office Action received for Japanese Patent Application No. 2014-058424, mailed on Mar. 17, 2015, 6 pages of English Translation and 1 pages of Japanese Office Action.
Hiroyuki, Oonuki, "Tech I vol. 31 x86 Assembler Introduction", CQ Publication Co., Ltd., Jan. 1, 2006, pp. 236 to 263.
Sioda, Sinji, "Details—Sandy Bridge Architecture", ASCII Technologies, ASCII Media Works Co., Ltd, No. 4, vol. 16, Feb. 24, 2011, pp. 28-35.
Office Action received for Korean Patent Application No. 2014-0037312, mailed on May 21, 2015, 2 pages of English Translation and 3 pages of Korean Office Action.
Office Action received for United Kingdom Patent Application No. 1405413.4, mailed on Aug. 25, 2015, 7 pages.
Cray Research, Inc., "Cray Assembly Language (CAL) for Cray PVP System Reference Manual", SR-3108 9.1, 1995, 4 pages.
Wikipedia, "Advanced Vector Extensions", From Wikipedia, the free encyclopedia, Mar. 2013, 5 pages.
Notice of Allowance received for Korean Application No. 10-2014-0037312, mailed on Nov. 18, 2015, 2 pages of Official copy only.
Office Action received for Chinese Patent Application No. 201410122763.3, mailed on Apr. 5, 2016, 12 pages of Official copy only.
Notice of Allowance received for Japanese Patent Application No. 2014-058424, mailed on Aug. 25, 2015, 2 pages of Official copy only.

* cited by examiner

NUMBER OF PACKED DATA
OPERATION MASK BITS
1250

| DATA ELEMENT WIDTH | PACKED DATA WIDTH | | |
|---|---|---|---|
| | 128 BITS | 256 BITS | 512 BITS |
| 8-BIT BYTES | 16 | 32 | 64 |
| 16-BIT WORDS | 8 | 16 | 32 |
| 32-BIT DWORDS / SP | 4 | 8 | 16 |
| 64-BIT QWORDS / DP | 2 | 4 | 8 |

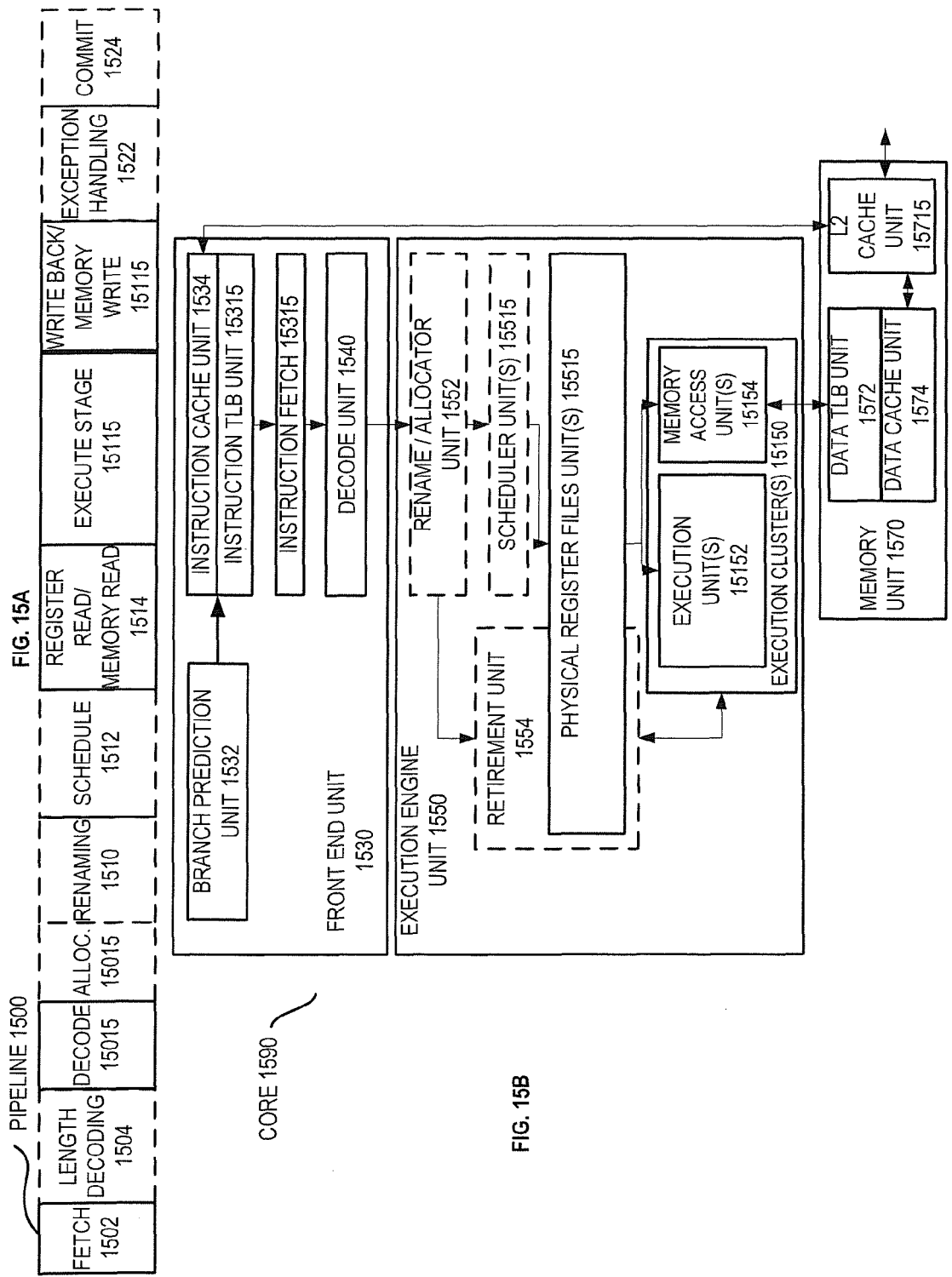

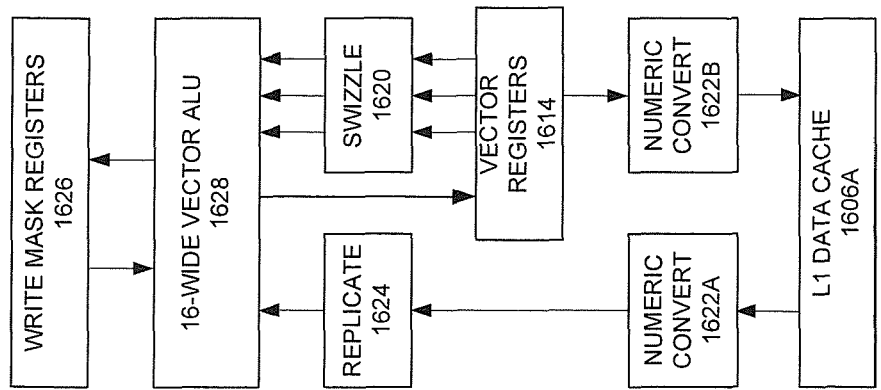
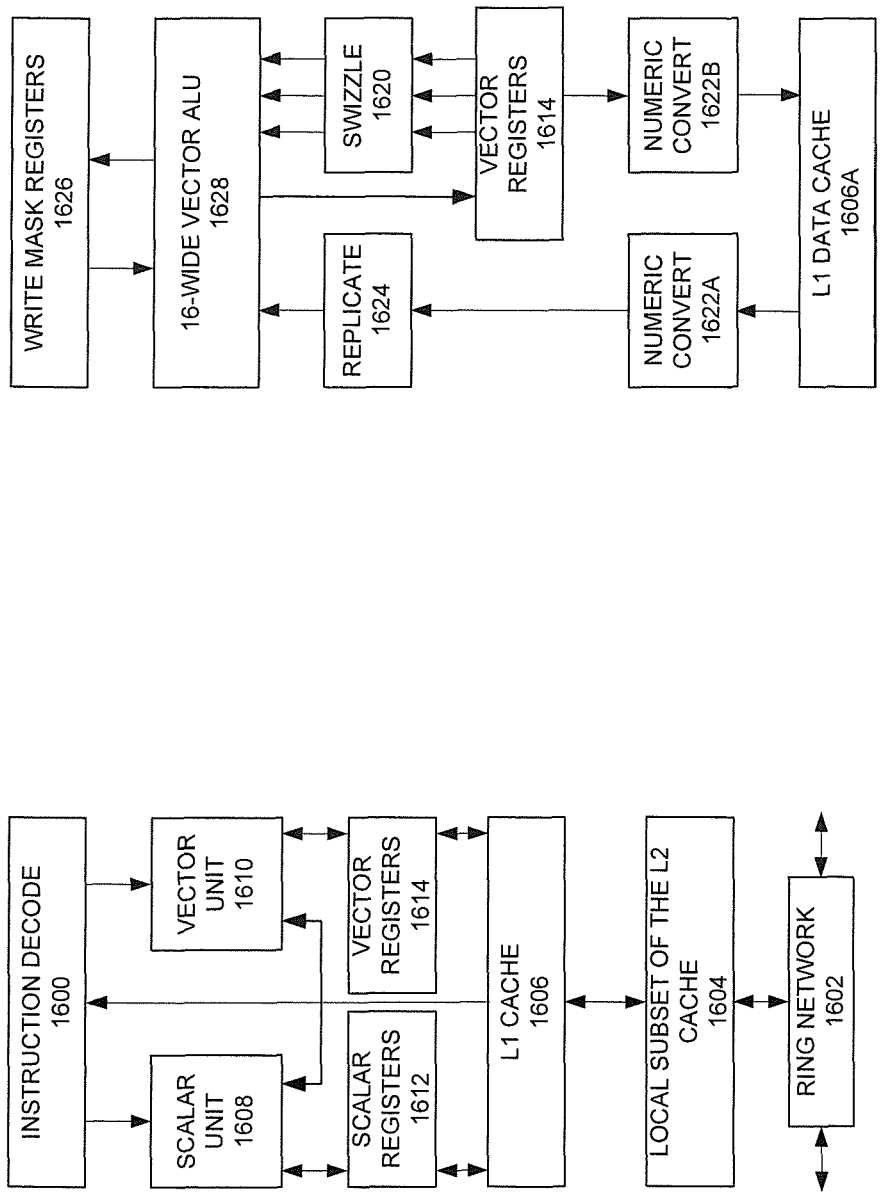

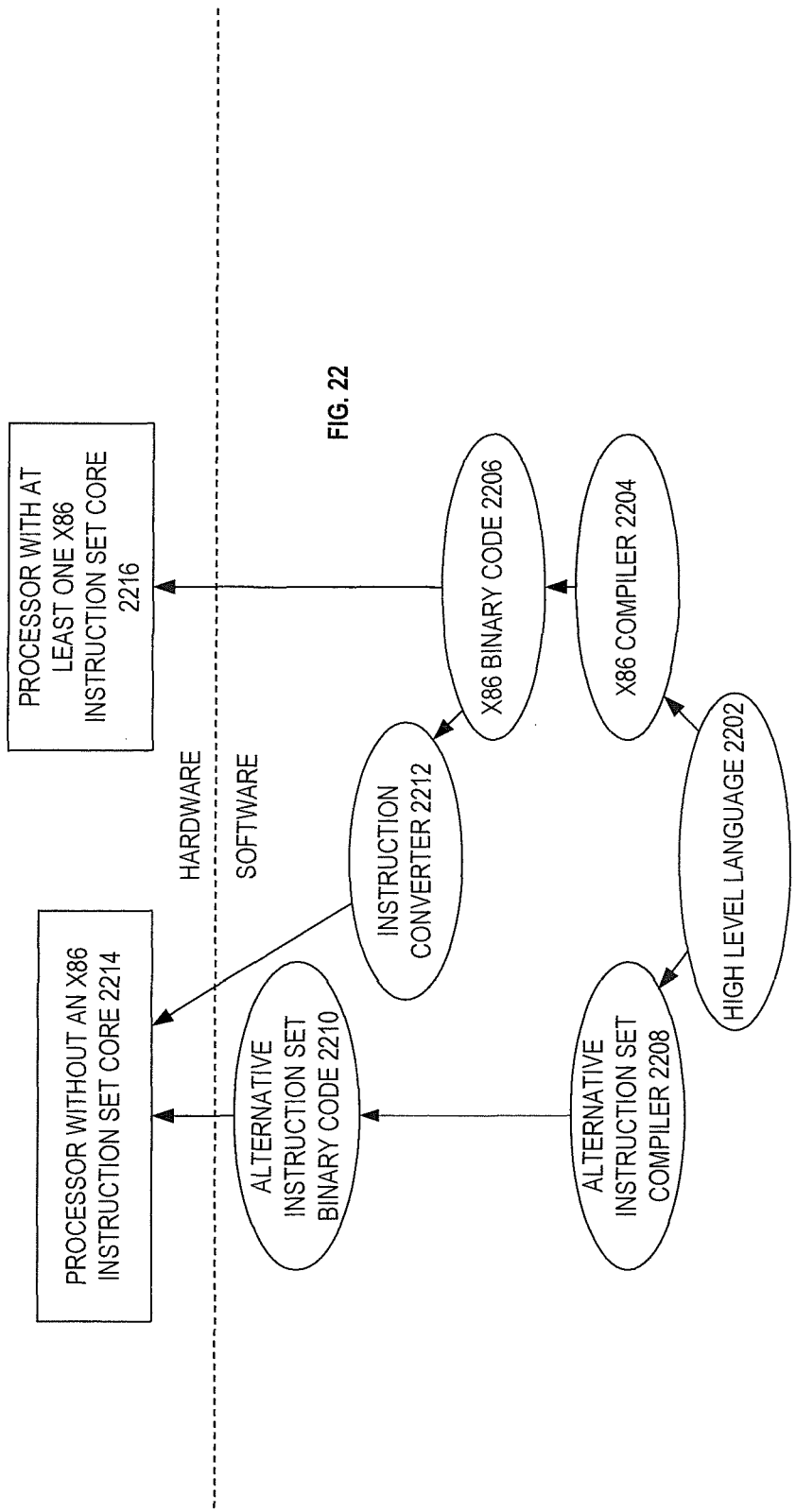

PROCESSORS, METHODS, AND SYSTEMS TO IMPLEMENT PARTIAL REGISTER ACCESSES WITH MASKED FULL REGISTER ACCESSES

BACKGROUND

1. Technical Field

Embodiments described herein generally relate to processors. In particular, embodiments described herein generally relate to accessing registers in processors.

2. Background Information

Many processors have Single Instruction, Multiple Data (SIMD) architectures. In SIMD architectures, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel.

Multiple data elements may be packed within one register or memory location as packed data. In packed data, the bits of the register or other storage location may be logically divided into a sequence of data elements. For example, a 128-bit wide packed data register may have two 64-bit wide data elements, four 32-bit data elements, eight 16-bit data elements, etc.

In some processor architectures, there has been an increase over the years in the width of packed data operands used by instructions. Such increased packed data widths generally allow more data elements to be processed concurrently or in parallel, which tends to improve performance. Even though there are instructions that utilize the wider packed data operands, it is still generally desirable to support the older instructions that utilize the narrower packed data operands, for example to provide backward compatibility. Moreover, often narrower registers that are used to store the narrower packed data operands may be aliased on wider registers that are used to store the wider or expanded packed data operands.

BRIEF DESCRIPTION OF THE DRAWINGS

The invention may best be understood by referring to the following description and accompanying drawings that are used to illustrate embodiments of the invention. In the drawings:

FIG. 15A is a block diagram illustrating both an exemplary in-order pipeline and an exemplary register renaming, out-of-order issue/execution pipeline according to embodiments of the invention.

FIG. 15B is a block diagram illustrating both an exemplary embodiment of an in-order architecture core and an exemplary register renaming, out-of-order issue/execution architecture core to be included in a processor according to embodiments of the invention.

FIG. 16A is a block diagram of a single processor core, along with its connection to the on-die interconnect network and with its local subset of the Level 2 (L2) cache, according to embodiments of the invention.

FIG. 16B is an expanded view of part of the processor core in FIG. 16A according to embodiments of the invention.

FIG. 22 is a block diagram contrasting the use of a software instruction converter to convert binary instructions in a source instruction set to binary instructions in a target instruction set according to embodiments of the invention.

DETAILED DESCRIPTION OF EMBODIMENTS

Disclosed herein are partial register access methods, processors, and systems. In the following description, numerous specific details are set forth (e.g., specific registers, instructions, masks, ways of performing partial register accesses, logic implementations, processor configurations, microarchitectural details, sequences of operations, logic partitioning/integration details, types and interrelationships of system components, and the like). However, it is understood that embodiments of the invention may be practiced without these specific details. In other instances, well-known circuits, structures and techniques have not been shown in detail in order not to obscure the understanding of this description.

Figure 1:
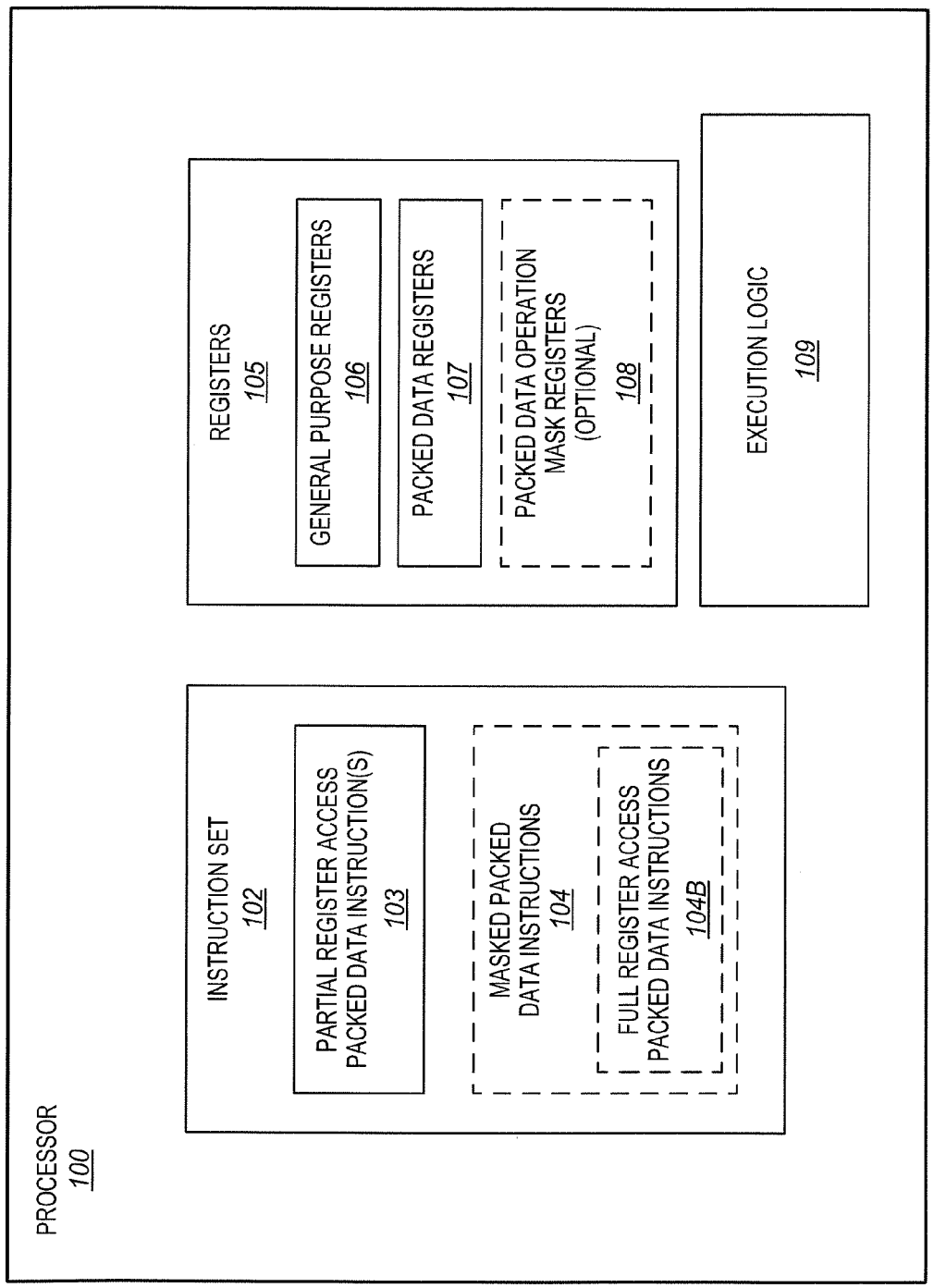
FIG. 1 is a block diagram of an embodiment of a processor.

FIG. 1 is a block diagram of an embodiment of a processor 100. In some embodiments, the processor may be a general-purpose processor (e.g., a general-purpose microprocessor of the type used as a central processing unit in various types of computer systems). Alternatively, the processor may be a special-purpose processor. Examples of suitable special-purpose processors include, but are not limited to, network processors, communications processors, cryptographic processors, graphics processors, coprocessors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors entirely.

The processor has an instruction set 102. The instructions of the instruction set represent macroinstructions, assembly language instructions, or machine-level instructions that are provided to the processor for execution. The instruction set includes one or more partial register access packed data instructions 103. In some embodiments, the partial register access packed data instructions may represent instructions that access one or more source and/or destination operands that represent only part of a register not the full width of the register. As one example, the partial register access packed data instructions may represent instructions that access 128-bit source and destination operands stored in 512-bit registers. The instruction set also optionally includes one or more masked packed data instructions 104. Optionally, the masked packed data instruction(s) include one or more masked full register access instructions 104B. In some embodiments, a masked full register access instruction may represent an instruction that accesses one or more source and/or destination operands that represent or occupy a full width of a register. As one example, the masked full register access instruction may represent an instruction that accesses 512-bit source and destination operands stored in 512-bit registers.

The processor includes architecturally-visible registers (e.g., an architectural register file) 105. The architectural registers may also be referred to herein simply as registers. Unless otherwise specified or apparent, the terms architectural register, register file, and register are used herein to refer to registers that are visible to the software and/or a programmer and/or the registers that are specified by macroinstructions to identify operands. These registers are contrasted to other non-architectural or non-architecturally-visible registers in a given microarchitecture (e.g., temporary registers used by instructions, reorder buffers, retirement registers, etc.). The registers generally represent on-die processor storage locations. The illustrated registers include scalar general-purpose registers 106, packed data registers 107, and optional packed data operation mask registers 108.

The processor also includes execution logic 109 (e.g., one or more execution units). The execution logic is operable to execute or process the instructions of the instruction set. For example, the execution logic may be operable to execute or process the partial register access packed data instruction(s) 103 and the masked full register access packed data instruction(s) 104B.

Figure 2:
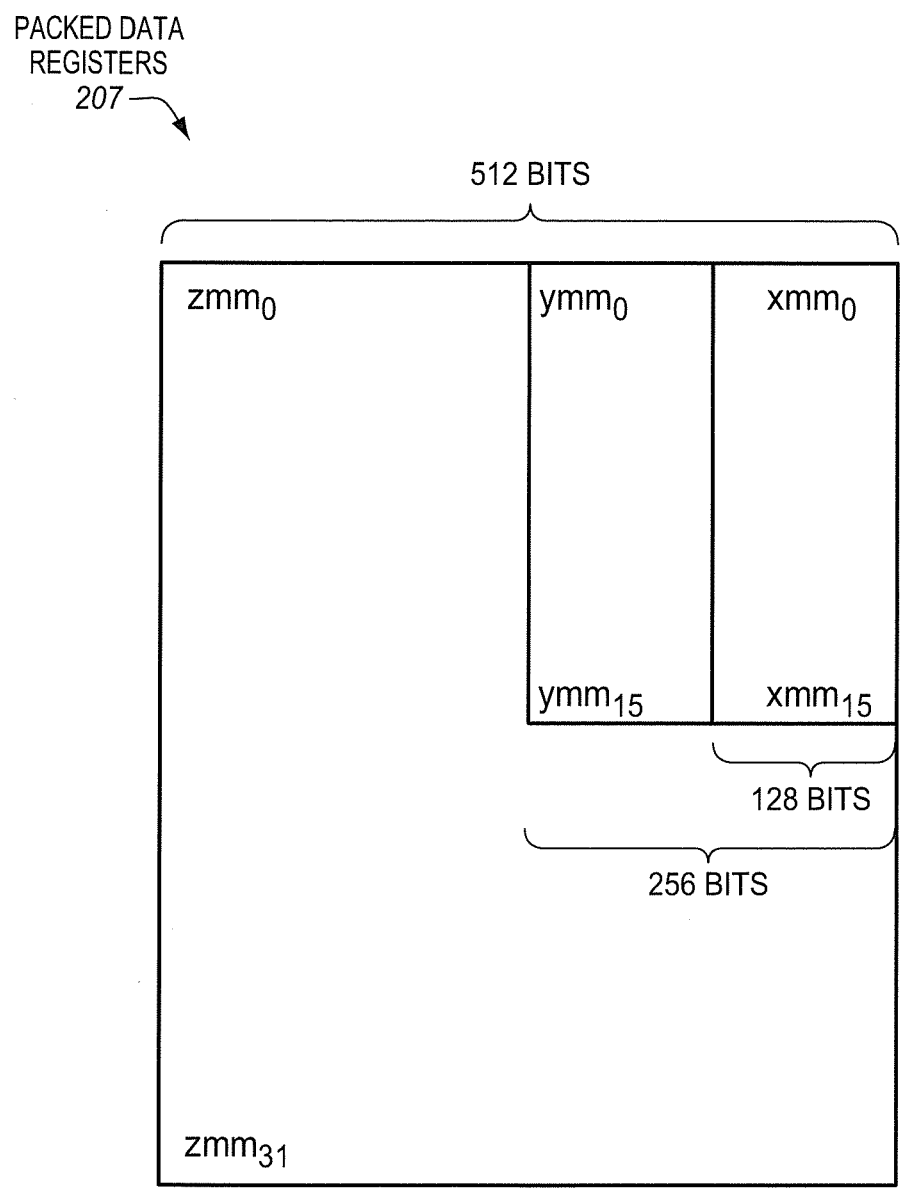
FIG. 2 is a block diagram of a first embodiment of a set of suitable packed data registers.

FIG. 2 is a block diagram of a first embodiment of a set of suitable packed data registers 207. The illustrated packed data registers include thirty-two 512-bit wide packed or vector registers. These thirty-two 512-bit registers are labeled ZMM0 through ZMM31. The lower sixteen of these 512-bit registers are ZMM0 through ZMM15. As shown, in some embodiments, the lower order 256-bits of the ZMM0-ZMM15 registers are aliased or overlaid on respective 256-bit packed or vector registers YMM0-YMM15, although this is not required. Likewise, in some embodiments, the lower order 128-bits of the YMM0-YMM15 registers are aliased or overlaid on respective 128-bit packed or vector registers XMM0-XMM15, although this also is not required.

The 512-bit registers ZMM0-ZMM31 are each operable to hold 512-bit packed data, 256-bit packed data, or 128-bit packed data. The 256-bit registers YMM0-YMM15 are each operable to hold 256-bit packed data or 128-bit packed data. The 128-bit registers XMM0-XMM1 are each operable to hold 128-bit packed data. Different data element sizes are supported including at least 8-bit byte data, 16-bit word data, 32-bit doubleword data, 32-bit single precision floating point data, 64-bit quadword data, and 64-bit double precision floating point data. Alternate embodiments of packed data registers may include different numbers of registers, different sizes of registers, and may or may not alias larger registers on smaller registers.

Historically, processors initially only included the XMM registers. Instructions in the instruction set operated on the XMM registers. Later, the YMM registers were added to increase the packed or vector widths to allow more data elements to be processed concurrently or in parallel. New instructions were added to the instruction set to operate on these wider YMM registers. More recently, the ZMM registers were added to further increase the packed or vector widths to allow still more data elements to be processed concurrently or in parallel. Additional new instructions were added to the instruction set to operate on these still wider ZMM registers. Even though these newer instructions and wider packed data widths are available, it is still generally desirable to provide backward compatibility and still support the older instructions. For example, it is generally desirable for the processor to continue to support the older instructions that operate on the XMM and YMM registers. However, since the XMM and YMM registers are aliased or overlaid on the wider ZMM registers, the use of these instructions often involve partial register accesses to narrower XMM and/or YMM operands stored within the wider 512-bit registers.

Figure 3A:
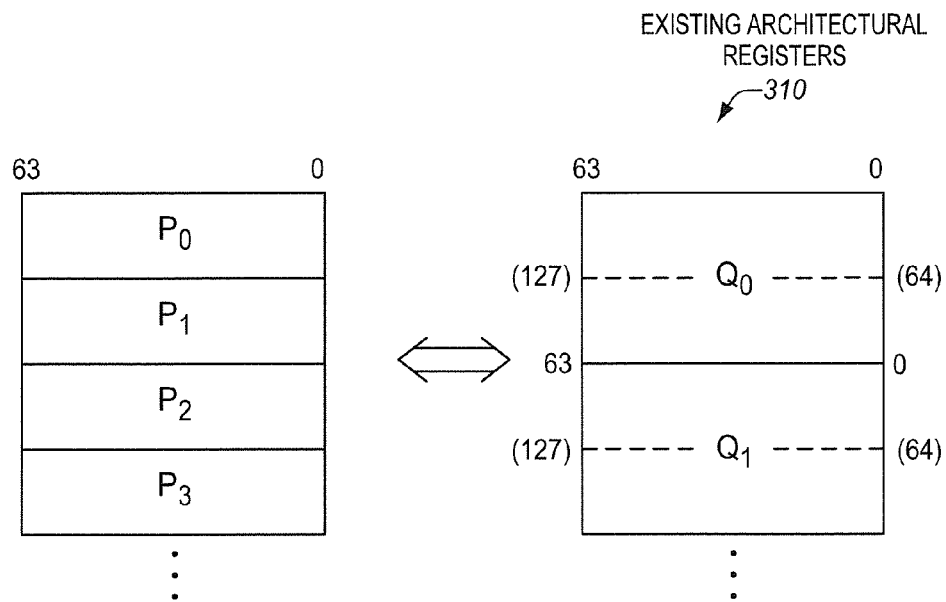
FIG. 3A is a block diagram of an existing set of registers in some processors.

FIG. 3A is a block diagram of an existing set of architectural registers 310 in some processors. The illustrated registers include four 64-bit packed data registers P0-P3, although more may optionally be included. These four 64-bit packed data registers may also be logically viewed as half as many, in the illustration two, 128-bit packed data registers Q0-Q1. The lowest order 64-bits (i.e., bits 63:0) of the 128-bit register Q0 correspond to the 64-bit register P0, whereas the highest order 64-bits (i.e., bits 127:64) of the 128-bit register Q0 correspond to the 64-bit register P1. Similarly, the lowest order 64-bits (i.e., bits 63:0) of the 128-bit register Q1 correspond to the 64-bit register P2, whereas the highest order 64-bits (i.e., bits 127:64) of the 128-bit register Q1 correspond to the 64-bit register P3.

Instead of increasing the widths of the packed data registers using aliasing as shown in the approach of FIG. 2, the approach used for these existing registers has been to logically group adjacent pairs of narrower 64-bit P0-P3 registers together to form wider 128-bit Q0-Q1 registers. However, one possible drawback with such an approach of logically grouping multiple narrower packed data registers to form a single wider packed data register, is a decrease in the number of wider packed data registers. There are only half as many 128-bit registers as there are 64-bit registers. Moreover, this problem may be exacerbated when packed data widths even wider than 128-bits are considered, since this may involve logically grouping three or more narrower registers to make a single wider register. For example, four 64-bit registers may be needed to make each 256-bit register.

Figure 3B:
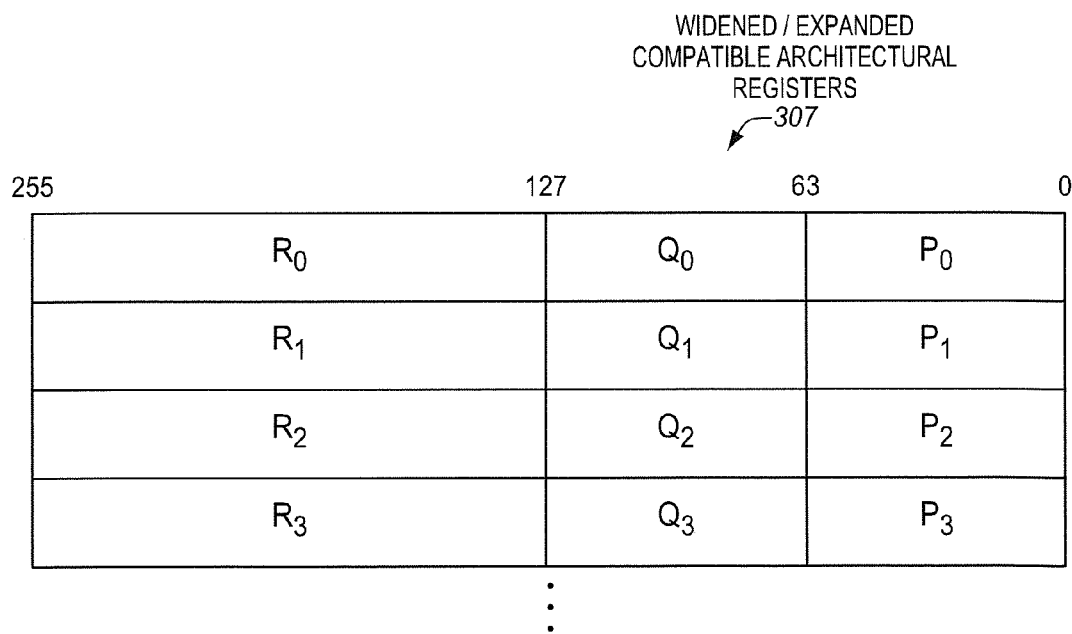
FIG. 3B is a block diagram of a second embodiment of a set of suitable packed data registers.

FIG. 3B is a block diagram of a second embodiment of a set of suitable architectural packed data registers 307. In one aspect, the registers 307 may represent a widened/expanded and compatible version of the existing registers 310 of FIG. 3A. The registers 307 include four wider 256-bit packed data registers R0-R3. These four wider 256-bit packed data registers R0-R3 implement the existing registers P0-P3 and Q0-Q1. As shown, in some embodiments, the lower order 64-bits of the R0-R3 registers overlap the respective 64-bit registers P0-P3, and the lower order 128-bits of the R0-R3 registers overlap the respective 128-bit registers Q0-Q3, although this is not required. In various embodiments, there may be any desired number of such 256-bit registers, such as, for example, sixteen, thirty two, sixty four, or some other number of registers. In other embodiments, instead of 256-bit registers, 512-bit registers, 1024-bit registers, or other widths either wider or narrower than 256-bits may be used. Different data element sizes may be supported including, for example, 8-bit byte, 16-bit word, 32-bit doubleword, 32-bit single precision floating point, 64-bit quadword, 64-bit double precision floating point, or various combinations thereof.

Since existing/legacy instructions may still specify the P0-P3 and/or the Q0-Q1 registers, and since deprecating such existing/legacy instructions may take many years or even decades, it may be important to provide backward compatibility and to allow the existing/legacy instructions to also be supported. For example, it may be important to still allow the existing/legacy instructions to operate on the P0-P3 and/or the Q0-Q1 registers. However, if the P0-P3 and/or the Q0-Q1 registers are overlaid on wider registers (e.g., as shown in FIG. 3B), then execution of such instructions may involve partial register accesses to read data from and/or write data to the P0-P3 and/or the Q0-Q1 registers overlaid on the wider registers.

Figure 4:
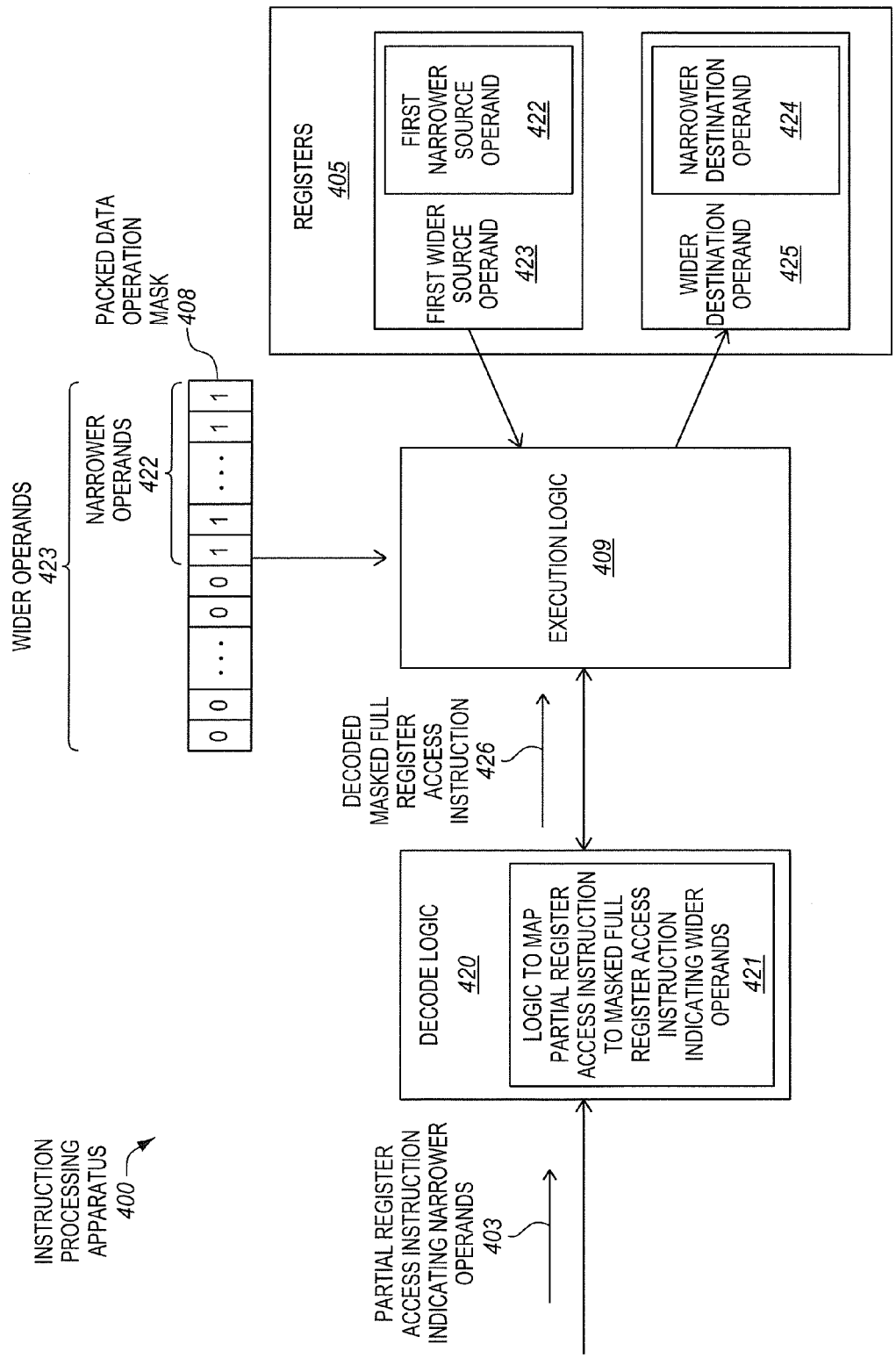
FIG. 4 is a block diagram of an embodiment of an instruction processing apparatus.

FIG. 4 is a block diagram of an embodiment of an instruction processing apparatus 400. In some embodiments, the instruction processing apparatus may be a processor and/or may be included in a processor. For example, in some embodiments, the instruction processing apparatus may be, or may be included in, the processor of FIG. 1. Alternatively, the instruction processing apparatus may be included in a similar or different processor. Moreover, the processor of FIG. 1 may include either a similar or different apparatus.

The apparatus 400 includes architectural registers 405. Each of the registers may represent an on-die storage location that is operable to store data. The registers may be implemented in different ways in different microarchitectures using well-known techniques and are not limited to any particular type of circuit. Various different types of registers are suitable. Examples of suitable types of registers include, but are not limited to, dedicated physical registers, dynamically allocated physical registers using register renaming, and combinations thereof. In some embodiments, the packed data registers 207 of FIG. 2, or the packed data registers 307 of FIG. 3, may be used for the registers 405. Alternatively, other registers may be used for the registers 405.

The apparatus may receive the partial register access instruction 403 which may indicate one or more relatively narrower operands. By way of example, the instruction may be received from an instruction fetch unit, an instruction queue, or the like. In some embodiments, the partial register access instruction may explicitly specify (e.g., through one or more fields or a set of bits), or otherwise indicate (e.g., implicitly indicate), a first relatively narrower source operand (e.g., a register) 422, and may specify or otherwise indicate a relatively narrower destination operand (e.g., a register) 424. In some embodiments, the first narrower source operand 422 may be part of a first wider source operand 423 and/or the narrower destination operand 424 may be part of a wider destination operand 425. As one example, the first narrower source operand 422 may be a first 128-bit XMM register, the first wider source operand 423 may be a first 512-bit ZMM register on which the first 128-bit XMM register is overlaid, the narrower destination operand 424 may be a second 128-bit XMM register, and the wider destination operand 425 may be a second 512-bit ZMM register on which the second 128-bit XMM register is overlaid. As used herein, the terms "narrower" and "wider" are relative terms (i.e., not absolute terms), which are relative to one another (e.g., the narrower source operand is narrower than the wider source operand, etc.). In other embodiments, the partial register access instruction may indicate as few as a single relatively narrower register. Moreover, in other embodiments, one or more memory locations may be used to replace one or more of the registers and/or the destination register may be the same as a source register.

The apparatus 400 also includes decode logic 420. The decode logic may also be referred to as a decode unit or decoder. The partial register access instruction may represent a machine code instruction, assembly language instruction, macroinstruction, or instruction and/or control signal of an instruction set of the apparatus. The decoder may decode, translate, interpret, morph, or otherwise convert the partial register access instruction. For example, the decoder may decode a relatively higher-level partial register access instruction to one or more corresponding relatively lower-level microinstructions, micro-operations, micro-code entry points, or other relatively lower-level instructions or control signals that reflect, represent, and/or are derived from the higher-level instructions. The decoder may be implemented using various different mechanisms including, but not limited to, microcode read only memories (ROMs), look-up tables, hardware implementations, programmable logic arrays (PLAs), and other mechanisms used to implement decoders known in the art.

In some embodiments, the decode logic 420 may include logic 421 to map the partial register access packed data instruction (which indicates the first narrower source packed data operand 422 and the narrower destination operand 424) to a masked full register access packed data instruction/operation that indicates the first wider source packed data operand 423 and the wider destination operand 425. The first wider source packed data operand 423 is wider than and includes the first narrower source packed data operand 422

(e.g., the narrower operand 422 may be aliased on the wider operand 423). The wider destination operand 425 is wider than and includes the narrower destination operand 424. In some embodiments, the partial register access instruction, and the masked full register access instruction, may have a same or closely analogous arithmetic, logical, or other operation (e.g., both may perform add operations, both may perform shift operations, etc.). In some embodiments, the masked full register access instruction may perform all operations of the partial register access instruction plus additional operations that may be masked out. The term masked refer to predication or conditional execution, which will be discussed further below. Advantageously, in some embodiments, the full register access instruction may perform a full register access instead of a partial register access.

Referring again to FIG. 4, the execution logic 409 is coupled with the decode logic 420 and the registers 405. By way of example, the execution logic may include an execution unit, an arithmetic unit, an arithmetic logic unit, a digital circuit to perform arithmetic and logical operations, a functional unit, a unit including integrated circuitry or hardware, or the like. The execution unit and/or the instruction processing apparatus may include specific or particular logic (e.g., circuitry or other hardware potentially combined with firmware and/or software) that is operable to perform operations responsive to the partial register access instruction 403 (e.g., in response to one or more instructions or control signals derived by the decode logic from the partial register access instruction 403).

In some embodiments, the execution unit may be operable to execute the masked full register access packed data instruction/operation with a packed data operation mask 408. In some embodiments, the packed data operation mask may include a mask element for each corresponding result data element of a packed data result that is to be stored by the masked full register access packed data instruction/operation. In some embodiments, all mask elements that correspond to result data elements to be stored by the masked full register access packed data instruction/operation that would not be stored by the partial register access packed data instruction are to be masking out. The execution unit may store the packed data result in the wider destination operand 425.

In some embodiments, the partial register access instruction may not indicate a packed data operation mask, but the packed data operation mask 408 may nevertheless be used to implement the execution of the partial register access instruction. In other embodiments, the partial register access instruction may indicate a packed data operation mask, but the packed data operation mask 408 may be wider in bits than the packed data operation mask indicated by the partial register access instruction (e.g., may have additional mask bits that are all deliberately masked out).

Packed data operation masks may represent predicate operands or conditional control operands. The packed data operation masks may also be referred to herein simply as masks. Each mask may predicate, conditionally control, or mask whether or not operations associated with an instruction are to be performed on source data elements and/or whether or not results of the operations are to be stored in a packed data result. Each mask may each include multiple mask elements, predicate elements, or conditional control elements.

In some embodiments, each mask may be operable to mask the operations at per-result data element granularity. In one aspect, the mask elements may be included in a one-to-one correspondence with result data elements (e.g., there may be four result data elements and four corresponding mask elements). Each different mask element may be operable to mask a different corresponding packed data operation, and/or mask storage of a different corresponding result data element, separately and/or independently of the others. For example, a mask element may be operable to mask whether or not a packed data operation is performed on a corresponding data element of a source packed data (or on a pair of corresponding data elements of two source packed data) and/or whether or not the result of the packed data operation is stored in a corresponding result data element.

Commonly each mask element may be a single bit. The single bit may allow specifying either of two different possibilities. As one example, each bit may specify either perform the operation versus do not perform the operation. As another example, each bit may specify store a result of the operation versus do not store a result of the operation. According to one possible convention, each mask bit may have a first value (e.g., set to binary 1) to allow a result of a packed operation to be stored in a corresponding result data element, or may have a second value (e.g., cleared to binary 0) to prevent a result of a packed operation to be stored in a corresponding result data element. The opposite convention is also possible.

In some embodiments, the operation may optionally be performed regardless of the corresponding mask bit or element, but the corresponding results of the operation may, or may not, be stored in the result packed data depending upon the value of the corresponding mask bit or element. Alternatively, in other embodiments, the operation may optionally be omitted (i.e., not performed) if the corresponding mask bit or element is masked out. In some embodiments, exceptions and/or violations may optionally be suppressed for, or not raised by, an operation on a masked-off element. In some embodiments, memory faults corresponding to masked-off data elements may optionally be suppressed or not raised.

To avoid obscuring the description, a relatively simple instruction processing apparatus 400 has been shown and described. In other embodiments, the apparatus may optionally include other well-known components found in processors. Examples of such components include, but are not limited to, a branch prediction unit, an instruction fetch unit, instruction and data caches, instruction and data translation lookaside buffers, prefetch buffers, microinstruction queues, microinstruction sequencers, a register renaming unit, an instruction scheduling unit, bus interface units, second or higher level caches, a retirement unit, other components included in processors, and various combinations thereof. There are literally numerous different combinations and configurations of components in processors, and embodiments are not limited to any particular combination or configuration. Embodiments may be included in processors have multiple cores, logical processors, or execution engines at least one of which has execution logic operable to execute an embodiment of an instruction disclosed herein.

Figure 5:
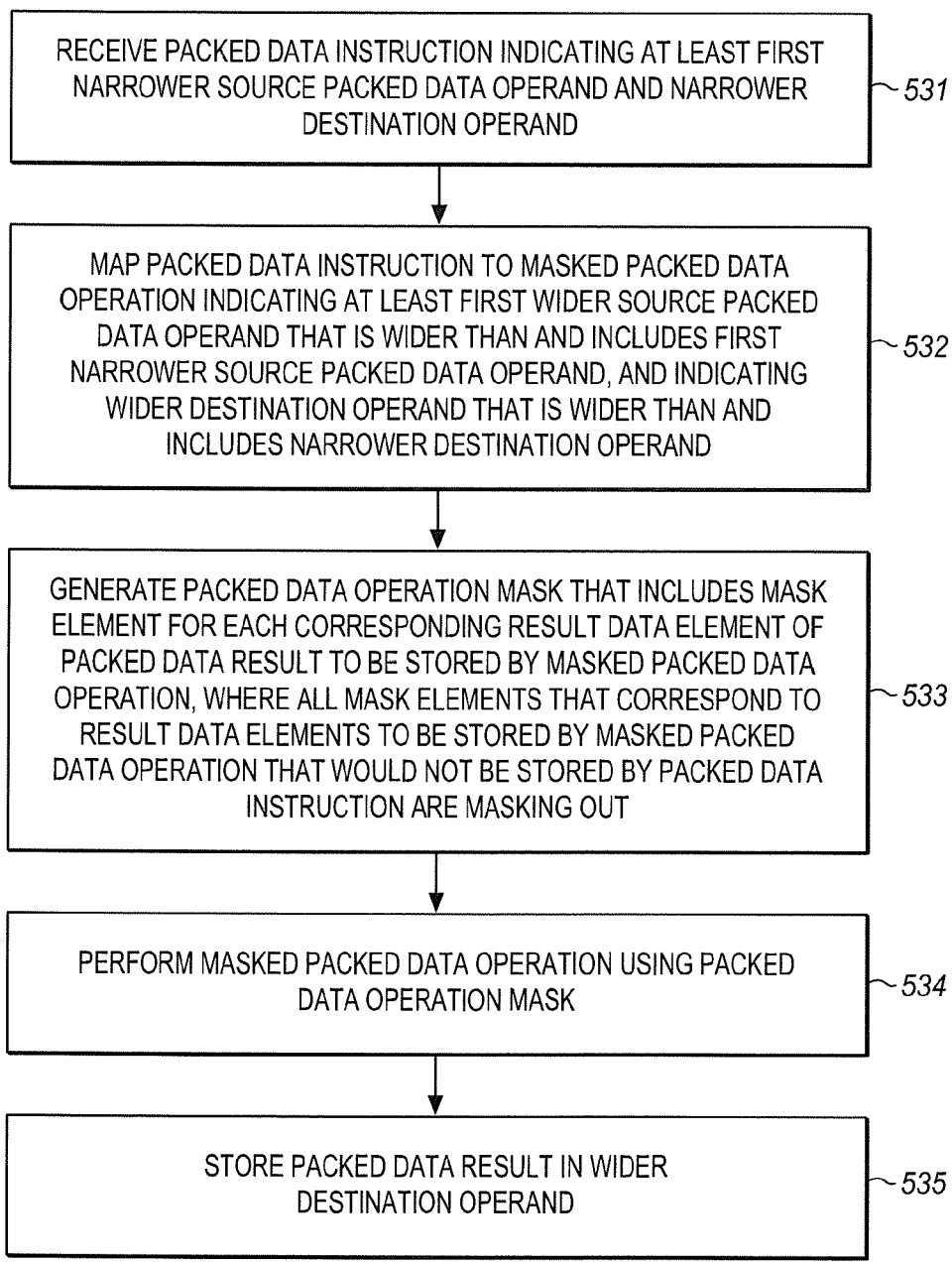
FIG. 5 is a block flow diagram of an embodiment of a method in a processor.

FIG. 5 is a block flow diagram of an embodiment of a method 530 in a processor. In some embodiments, the operations and/or method of FIG. 5 may be performed by and/or within the processor of FIG. 1 and/or the apparatus FIG. 4. The components, features, and specific optional details described herein for the processor of FIG. 1 and the apparatus of FIG. 4 also optionally apply to the operations and/or method of FIG. 5. Alternatively, the operations and/or method of FIG. 5 may be performed by and/or within a similar or entirely different processor or apparatus. Moreover, the processor of FIG. 1 and the apparatus of FIG. 4 may perform similar or different operations and/or methods than those of FIG. 5.

The method includes receiving a packed data instruction, at block 531. In various aspects, the first instruction may be received from an off-die source (e.g., from system memory, a disc, or a system interconnect), or from an on-die source (e.g., from an instruction cache or instruction fetch unit). In some embodiments, the packed data instruction may indicate a first narrower source packed data operand, optionally a second narrower source packed data operand, and a narrower destination operand.

The method includes mapping the packed data instruction to a masked packed data operation, at block 532. In some embodiments, the masked packed data operation may indicate a first wider source packed data operand that is wider than and includes the first narrower source packed data operand, optionally a second wider source packed data operand that is wider than and includes the second narrower source packed data operand, and a wider destination operand that is wider than and includes the narrower destination operand. In some embodiments, the masked packed data operation may indicate a packed data operation mask, whether or not the received packed data instruction is a masked instruction and/or indicates a packed data operation mask. In some embodiments, decode logic (e.g., a decode unit) may perform the mapping.

The method includes generating a packed data operation mask, at block 533. In some embodiments, the packed data operation mask may include a mask element for each corresponding result data element of a packed data result to be stored by the masked packed data operation. In some embodiments, all mask elements that correspond to result data elements to be stored by the masked packed data operation that would not be stored by the packed data instruction may be masking out.

The method includes performing the masked packed data operation using the packed data operation mask, at block 534. The method includes storing the packed data result in the wider destination operand, at block 535. In some embodiments, storing the packed data result in the wider destination operand may include performing a full register write instead of a partial register write. In some embodiments, the wider destination operand may entirely fill the destination register, whereas the narrower destination operand would only have partially filled the destination register such that a partial register write may have been needed if the mapping had not been performed.

Figure 6:
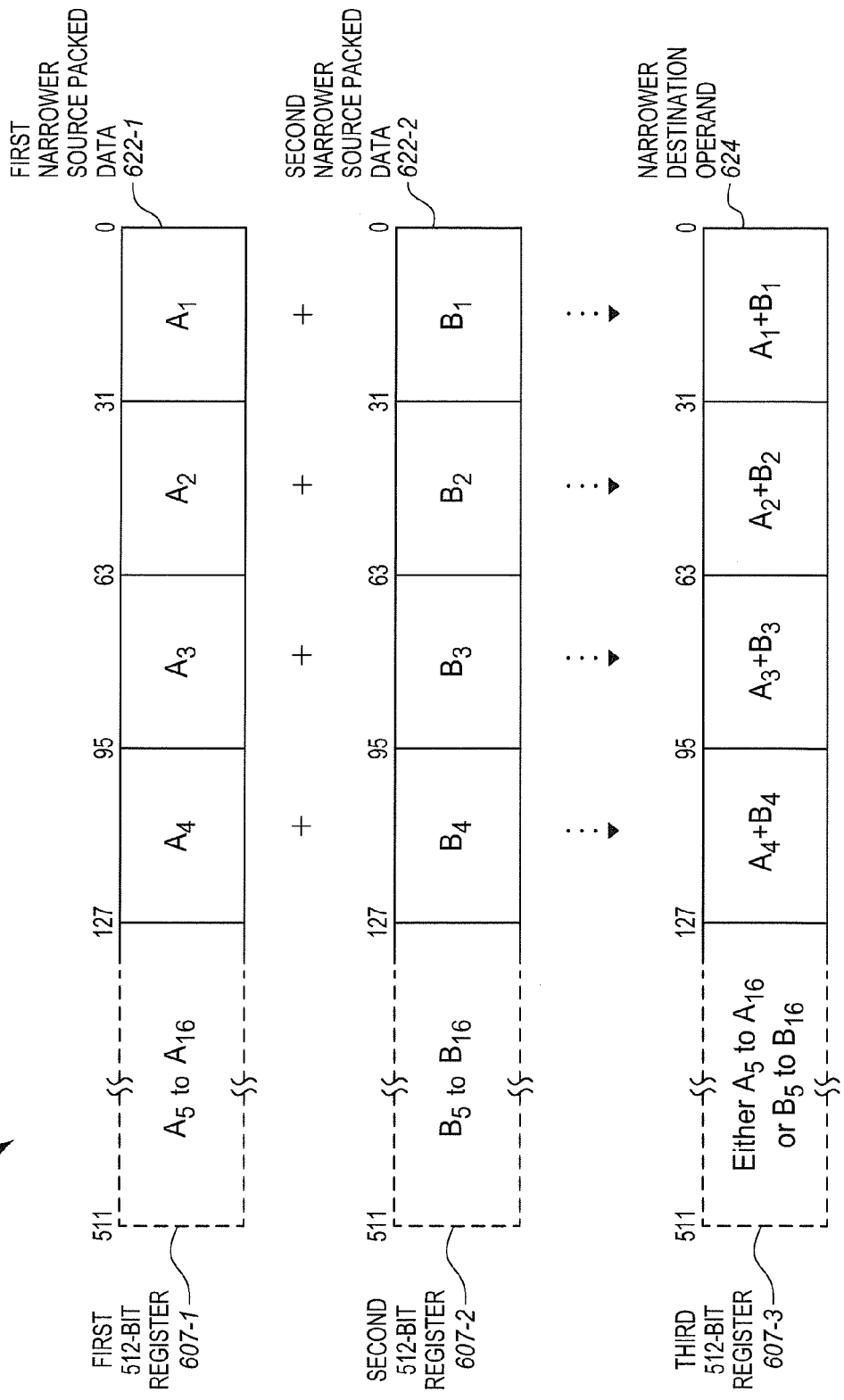
FIG. 6 is a block diagram illustrating a partial register access operation, which may be performed on narrower operands that are overlaid on wider operands, in response to a partial register access instruction.

FIG. 6 is a block diagram illustrating a partial register access operation 603, which may be performed on narrower operands that are overlaid on wider operands, in response to a partial register access instruction. The partial register access instruction may specify or otherwise indicate a first narrower source packed data 622-1, may specify or otherwise indicate a second narrower source packed data 622-2, and may specify or otherwise indicate a narrower destination operand 624 (e.g., a storage location) where a result packed data may be stored. In the illustrated example, each of the first narrower source operand, the second narrower source operand, and the narrower destination operand are 128-bits wide and include four 32-bit data elements. In the illustration, the first narrower source packed data has, from the least significant position (on the right), to the most significant position (on the left), the values A1, A2, A3, and A4. Similarly, the second narrower source packed data has, from the least significant position (on the right), to the most significant position (on the left), the values B1, B2, B3, and B4. Other examples may use other packed data widths (e.g., 64-bit, 256-bit, 512-bit, etc.) with either narrower (e.g., 8-bit, 16-bit, etc.) or wider (e.g., 64-bit) data elements.

The narrower 128-bit operands are stored in wider registers. In the illustration, the wider registers are 512-bit registers. In particular, the first narrower source packed data 622-1 is stored in a first 512-bit register 607-1, the second narrower source packed data 622-2 is stored in a second 512-bit register 607-2, and the narrower destination operand 624 is stored in a third 512-bit register 607-3. In other embodiments, other register widths may be used, such as, for example, 256-bit registers or 1024-bit registers. Bits 511:128 of the first 512-bit register store values A5 to A16. Similarly, bits 511:128 of the second 512-bit register store values B5 to B16.

A result packed data is generated and stored in the narrower destination operand 624 in response to the instruction/operation. The result packed data includes a plurality of result packed data elements. In the illustrated example, the result packed data is 128-bits wide and includes four 32-bit result data elements. Each of the result data elements includes a result of an operation, in this case an addition operation or sum, performed on a corresponding pair of source data elements from the first and second narrower source packed data in corresponding relative bit positions. For example, in the illustration, the result packed data has, from the least significant position (on the right), to the most significant position (on the left), the values A1+B1, A2+B2, A3+B3, and A4+B4. It is to be appreciated that the addition operation is just one illustrative example, and that other arithmetic (e.g., multiplication, subtraction, etc.) and/or logical (e.g., shift, rotate, logical AND, logical XOR, etc.) operations are also suitable.

Since the 128-bit first and second narrower source packed data 622-1, 622-2 are only part of the wider first and second 512-bit registers 607-1, 607-2, accessing the narrower source operands may involve partial register read of the first and second 512-bit registers. For example, the values A1 to A4 may be read without reading the values A5 to A16. Moreover, since the narrower 128-bit result packed data and/or the narrower 128-bit destination operand are only part of the wider third 512-bit register 607-3, storing the result may involve a partial register write to the third 512-bit register. For example, the values A1+B1, A2+B2, A3+B3, and A4+B4, may be stored in the third 512-bit register without destroying the existing content in bits 511:128 of the third 512-bit register (e.g., without destroying the values of either A5 to A16 or B5 to B16). In some embodiments, it may be desirable to avoid, or at least reduce, the number of such partial register accesses.

Figure 7:
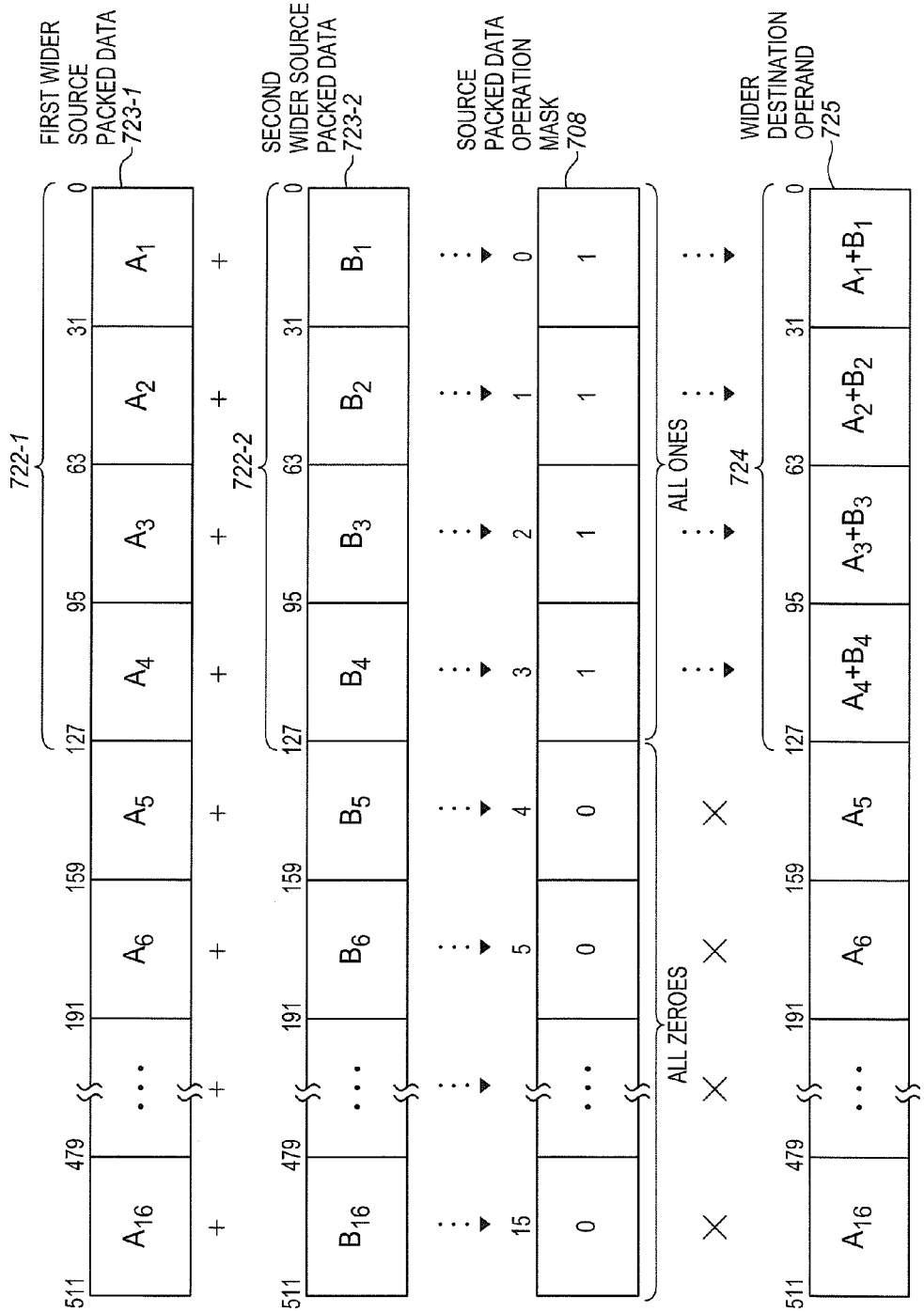
FIG. 7 is a block diagram of an example embodiment of a masked full register access packed data operation on wider operands that may be performed in response to a partial register access packed data instruction indicating narrower operands.

FIG. 7 is a block diagram of an example embodiment of a masked full register access packed data operation 740 on wider operands that may be performed in response to a partial register access packed data instruction indicating narrower operands. In some embodiments, a processor or a portion thereof (e.g., a decode unit) may map the partial register access packed data instruction to the masked full register access packed data operation in order to replace one or more partial register accesses that would be performed by the partial register access packed data instruction with one or more corresponding full register accesses performed by the masked full register access packed data operation. In some embodiments, the masked full register access packed data operation of FIG. 7 may be used to implement the partial register access instruction and/or operation of FIG. 6.

The masked full register access packed data operation may use a first wider source packed data 723-1 having a first narrower source packed data 722-1 indicated by the partial register access instruction, and a second wider source packed data 723-2 having a second narrower source packed data 722-2 indicated by the partial register access instruction. In the illustrated embodiment, each of the first and second wider source packed data are 512-bits wide and have sixteen 32-bit data elements, and each of the first and second narrower source packed data are 128-bits wide and have four 32-bit data elements, although the scope of the invention is not so limited. In the illustration, the first wider source packed data has, from the least significant position (on the right), to the most significant position (on the left), the values A1, A2, A3, A4, A5, A6 . . . A16. In the illustration, the second wider source packed data has, from the least significant position (on the right), to the most significant position (on the left), the values B1, B2, B3, B4, B5, B6 . . . B16. Source data elements in the same relative bit positions within the two source packed data (e.g., in the same vertical positions as illustrated) represent pairs of corresponding data elements. In other embodiments, any other appropriate wider and narrower source packed data widths may be used instead (e.g., 128-bit, 256-bit, or 1024-bit wider widths, with 32-bit, 64-bit, 128-bit, or 256-bit narrower widths). Moreover, in other embodiments, other data elements widths besides 32-bits may optionally be used, such as, for example, 8-bit byte, 16-bit word, or 64-bit doubleword or double precision floating point, to name a few examples.

The masked full register access packed data operation may also use a source packed data operation mask 708. As shown in the illustration, commonly each mask element may be a single bit. Alternatively, if selecting between more than two different options is desired, then two or more bits may be used for each mask element. As also shown, there may be one mask element, in this case a single bit, for each pair of corresponding source data elements and/or for each result data element. In the illustrated embodiment, since there are sixteen pairs of corresponding data elements in the first and second source packed data, the packed data operation mask includes sixteen mask elements or bits. Each of the sixteen mask bits may correspond to a different result data element of a packed data result in the wider destination operand 725. In the illustration, the corresponding data elements and their corresponding mask bits are in vertical alignment relative with one another. Each of the mask bits is either set to binary one (i.e., 1) or is cleared to binary zero (i.e., 0). The mask bits set to binary one (i.e., 1) represent un-masked bits, whereas the mask bits cleared to binary zero (i.e., 0) represent masked bits.

A 512-bit result packed data is stored in the wider destination operand 725 in response to the masked full register access packed data operation. In some embodiments, the 512-bit result packed data is stored in the wider destination operand (e.g., a 512-bit register) through a full register write or store. In some embodiments, the 512-bit result packed data and/or the wider destination operand 725 includes a narrower 128-bit destination operand 724 indicated by the corresponding partial register access instruction. In this particular example, the masked full register access packed data operation is a masked packed data addition operation that conditionally stores sums of corresponding pairs of data elements from the first and second wider source packed data as a result packed data in the wider destination operand 725 based on the predication from the corresponding mask bits of the packed data operation mask 708. When a given mask bit is set (i.e., 1), then a sum of a pair of corresponding source data elements is allowed to be stored in the corresponding result data element. Conversely, when a given mask bit is cleared (i.e., 0), then a sum of a pair of corresponding source data elements is not allowed to be stored in the corresponding result data element. Rather, in some embodiments, the original/starting value in that result data element may be retained or preserved unchanged.

In some embodiments, mask elements that correspond to result data elements in the wider destination operand, but not in the narrower destination operand, may all be deliberately masked out. In some embodiments, all mask elements that corresponding to result data elements in the narrower destination operand, but not in the wider destination operand, may all be unmasked (e.g., unless the partial register access instruction itself uses predication to mask out some of these result data elements). For example, a same number of lowest order or least significant mask bits as result data elements in the narrower destination operand may be set to binary one, whereas a same number of highest-order or most-significant mask bits as result data elements in the wider destination operand but not in the narrower destination operand may be cleared to binary zero. Referring again to the illustrated embodiment, the source packed data operation mask has, from the least significant position (on the right), to the most significant position (on the left), the values 1, 1, 1, 1, 0, 0 . . . 0. That is, the four lowest order mask bits are set, whereas the twelve highest order mask bits are cleared. The mask bits may be dynamically determined at execution time whereas the partial register accesses are generally statically fixed at compile time. For each of the mask bits that is set, a sum may be stored in a corresponding result data element. For example, as shown, the lowest order four result data elements store the values A1+B1, A2+B2, A3+B3, and A4+B4. In this embodiment, all data elements within the lower-order 128-bit portion of the 512-bit operands, which pertain to the original partial register access instruction/operation (e.g., the instruction/operation of FIG. 6), are all unmasked.

Conversely, all higher order data elements in bits 511:128 are all masked out, since they do not pertain to the original partial register access instruction/operation which only used 128-bit operands. For each of the mask bits that are cleared, another value besides a sum may be stored in the corresponding result data element. For example, in some embodiments where a source is reused as a destination, merging-masking may be performed in which a corresponding value of a data element from a wider source packed data may be stored in a given masked out result data element. For example, as shown in the illustration, the values A5 through A16 from bits 511:128 of the first wider source packed data may be stored in bits 511:128 of the wider destination operand. Alternatively, in another embodiment, the values B5 through B16 may be stored in bits 511:128 of the wider destination operand. In other embodiments, if the destination is a different register than the source registers, the original contents in the masked out result data elements of the destination may be retained or left unchanged. Advantageously, these cleared most-significant mask bits may be used to mask out that portion of the wider 512-bit register not needed for the original partial register access instruction (e.g., the instruction/operation of FIG. 6) which used only 128-bit operands.

The mask bits may be implemented in different ways. As one example, in some embodiments, a selection operation may be performed in which either the result of the operation is selected to be written to the corresponding result data element, or the original value of the corresponding result data element in the destination (i.e., the original/starting contents) may be selected to be written back to the corresponding result data element. As another example, in other embodiments, a conditional write may be performed in which a mask bit conditions whether or not a result of the operation is to be written to the corresponding result data element or no write is to be performed thereby leaving the result data element with its original/starting contents.

It is to be appreciated that this is just one illustrative example of a suitable masked full register access packed data operation on wider operands that may be used to implement a partial register access packed data instruction indicating narrower operands. Other operations on two source packed data, such as, for example, subtraction, multiplication, division, packed comparisons, and the like, are also suitable. Still other suitable operations involve single source packed data operands. Examples include, but are not limited to, packed shifts, packed rotates, packed magnitude scaling, packed reciprocal square root, and the like. Still other suitable operations include operations on more than two source packed data, source packed data of different sizes, source packed data of different numbers of data elements, operations performed in a horizontal or non-vertically aligned fashion, partly scalar and partly packed operations, and still other operations know in the arts.

In other embodiments, partial register access instructions/operations and/or the corresponding masked full register access packed data operations used to implement them, may operate on intermediate bits in a register. For example, the intermediate bits may represent a contiguous range of bits (e.g., one or more packed data elements) between a least significant range of bits (e.g., one or more packed data elements) and a most significant range of bits (e.g., one or more packed data elements).

Figure 8:
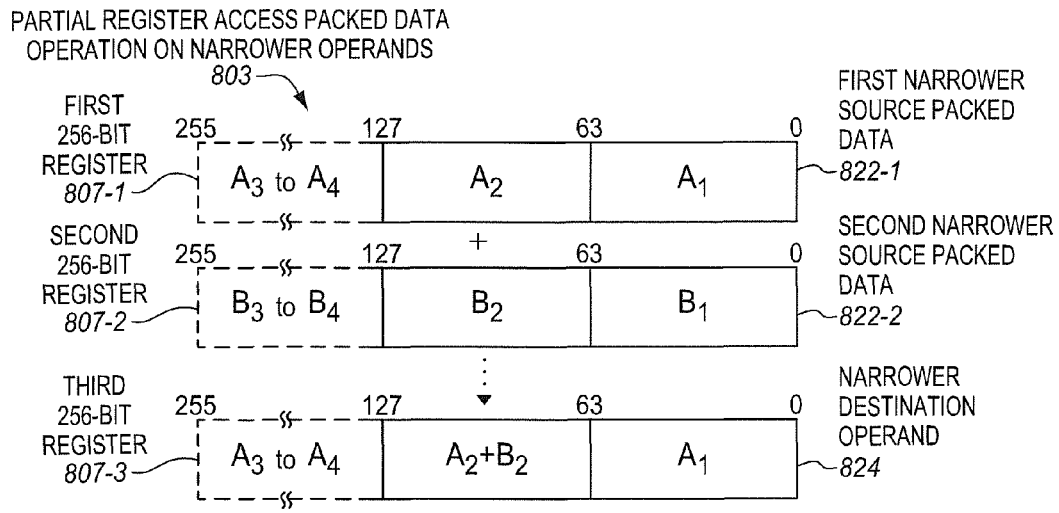
FIG. 8 is a block diagram illustrating a partial register access operation, which may be performed on narrower operands that are overlaid on wider operands, in response to a partial register access instruction.

FIG. 8 is a block diagram illustrating a partial register access operation 803, which may be performed on narrower operands that are overlaid on wider operands, in response to a partial register access instruction. The partial register access instruction may specify or otherwise indicate a first narrower source packed data 822-1, may specify or otherwise indicate a second narrower source packed data 822-2, and may specify or otherwise indicate a narrower destination operand 824 (e.g., a storage location) where a result packed data may be stored. In the illustrated example, each of the first narrower source operand, the second narrower source operand, and the narrower destination operand are 128-bits wide and include two 64-bit data elements, although the scope of the invention is not so limited. In the illustration, the first narrower source packed data has, from the least significant position (on the right), to the most significant position (on the left), the values A1 and A2. Similarly, the second narrower source packed data has, from the least significant position (on the right), to the most significant position (on the left), the values B1 and B2. Other examples may use other packed data widths (e.g., 64-bit, 256-bit, 512-bit, etc.) with either narrower (e.g., 8-bit, 16-bit, etc.) or wider (e.g., 64-bit) data elements.

The narrower 128-bit operands are stored in wider registers. In the illustration, the wider registers are 256-bit registers. In particular, the first narrower source packed data 822-1 is stored in a first 256-bit register 807-1, the second narrower source packed data 822-2 is stored in a second 256-bit register 807-2, and the narrower destination operand 824 is stored in a third 256-bit register 807-3. In other embodiments, other register widths may be used, such as, for example, 512-bit registers or 1024-bit registers. Bits 255:128 of the first 256-bit register store values A3 and A4. Similarly, bits 255:128 of the second 256-bit register store values B3 and B4.

A result packed data is generated and stored in the narrower destination operand 824 in response to the instruction/operation. In the illustrated example, the result packed data is 128-bits wide and includes two data elements. A lowest order data element in bits 63:0 includes the value A1 of the corresponding data element from the first source packed data. In this case, no addition operation was performed to generate this data element. A higher order data element in bits 127:64 includes a sum A2+B2 which represents the sum of the pair of corresponding data elements from the first and second source packed data. Since the 128-bit first and second narrower source packed data 822-1, 822-2 are only part of the wider first and second 256-bit registers 807-1, 807-2, accessing the narrower source operands may involve partial register reads. Moreover, since the narrower 128-bit result packed data and/or the narrower 128-bit destination operand are only part of the wider third 256-bit register 807-3, storing the result may involve a partial register write. For example, in some embodiments, the first 256-bit register may be reused as the destination operand, and the sum A2+B2 may be stored in bits 127:64 of this 256-bit register without overwriting other preexisting contents of this register (e.g., without overwriting A1, A3, and A4). This may involve a partial register write. In some embodiments, it may be desirable to avoid, or at least reduce, the number of such partial register accesses.

Figure 9:
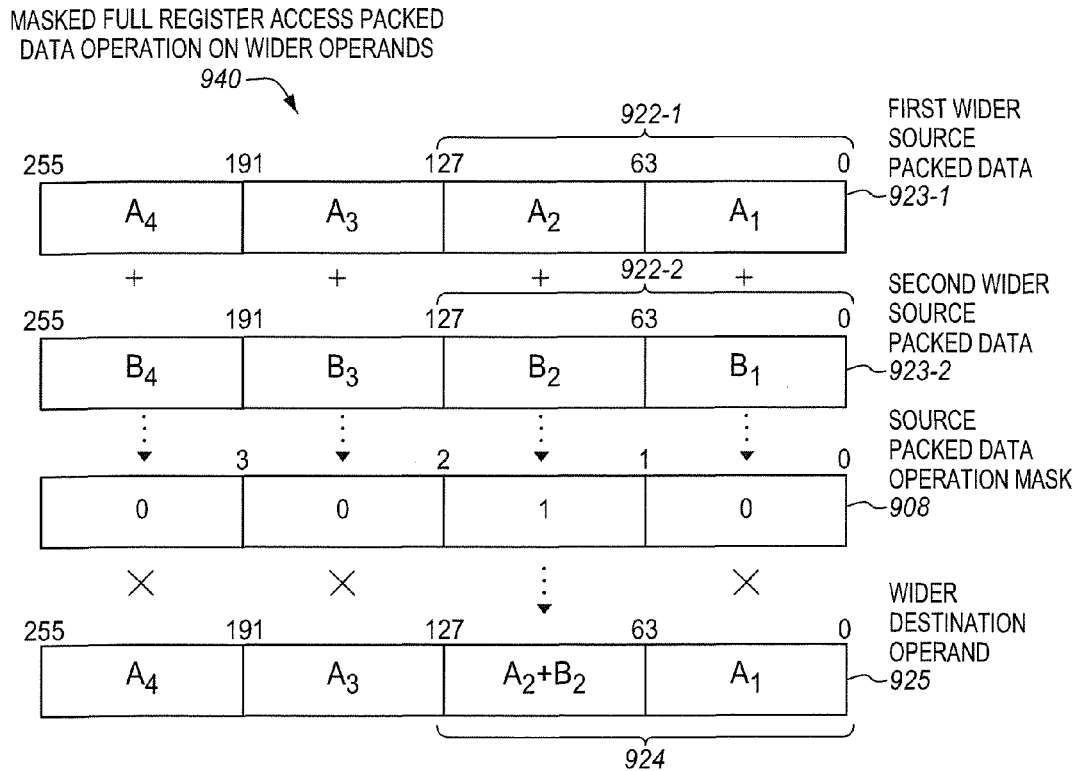
FIG. 9 is a block diagram of an example embodiment of a masked full register access packed data operation on wider operands that may be performed in response to a partial register access packed data instruction indicating narrower operands.

FIG. 9 is a block diagram of an example embodiment of a masked full register access packed data operation 940 on wider operands that may be performed in response to a partial register access packed data instruction indicating narrower operands. In some embodiments, a processor or a portion thereof (e.g., a decode unit) may map the partial register access packed data instruction to the masked full register access packed data operation in order to replace one or more partial register accesses that would be performed by the partial register access packed data instruction with one or more corresponding full register accesses performed by the masked full register access packed data operation. In some embodiments, the masked full register access packed data operation of FIG. 9 may be used to implement the partial register access instruction and/or operation of FIG. 8.

The masked full register access packed data operation may use a first wider source packed data 923-1 having a first narrower source packed data 922-1 indicated by the partial register access instruction, and a second wider source packed data 923-2 having a second narrower source packed data 922-2 indicated by the partial register access instruction. In the illustrated embodiment, each of the first and second wider source packed data are 256-bits wide and have four 64-bit data elements, and each of the first and second narrower source packed data are 128-bits wide and have two 64-bit data elements, although the scope of the invention is not so limited. In the illustration, the first wider source packed data has, from the least significant position (on the right), to the most significant position (on the left), the values A1, A2, A3, and A4. In the illustration, the second wider source packed data has, from the least significant position (on the right), to the most significant position (on the left), the values B1, B2, B3, and B4. In other embodiments, any other appropriate wider and narrower source packed data widths may be used instead. Moreover, in other embodiments, other data elements widths may optionally be used.

The masked full register access packed data operation may also use a source packed data operation mask 908. In the illustrated embodiment, since there are four data elements in the destination operand, there are four corresponding mask bits. In this example, the source packed data operation mask has, from the least significant position (on the right), to the most significant position (on the left), the values 0, 1, 0, 0.

A 256-bit result packed data is stored in the wider destination operand 925 in response to the masked full register access packed data operation. In some embodiments, the 256-bit result packed data is stored in the wider destination operand (e.g., a 256-bit register) through a full register write or store. In some embodiments, the 256-bit result packed data and/or the wider destination operand 925 includes a narrower 128-bit destination operand 924 indicated by the corresponding partial register access instruction. As shown, only a single sum may be stored in the 256-bit result packed data. Namely, a sum A2+B2 may be stored in bits 127:64 of the destination operand 925. Only the single mask bit corresponding to bits 127:64 of the destination operand 925 where the sum A2+B2 is to be stored is set. All other mask bits are cleared. For each of the cleared mask bits, a value of a corresponding data element from the first wider source packed data 923-1 is stored in the destination operand 925. In particular, the value A1 is stored in bits 63:0 of the destination operand, the value A3 is stored in bits 191:128 of the destination operand, and the value A4 is stored in bits 255:192 of the destination operand. These other mask bits are masked out since they do not pertain to the single sum A2+B2 according to the original partial register access instruction/operation. Advantageously, these cleared most-significant mask bits may be used to mask out that portion of the wider 256-bit register not needed for the original partial register access instruction (e.g., the instruction/operation of FIG. 8) and allow a full register access instead of a partial register access to be performed. As before, many other arithmetic and/or logical operations are also suitable.

FIGS. 6-7 show an embodiment where the narrower operands occupy the least significant bits of the wider operands. FIGS. 8-9 show an embodiment where the narrower operands, or at least the portions of the narrower operands of interest, occupy intermediate portions between the least and most significant ends of the wider operands. In still other embodiments, the narrower operands may occupy the most significant portions of the wider operands. In still other embodiments, a combination of such positions may optionally be used.

In the examples described above, the partial register access instructions/operations operated on corresponding pairs of data elements (i.e., those in corresponding relative bit positions within the first and second source operands). In the illustrations, those corresponding pairs of data elements were vertically aligned. In other embodiments, partial register access instructions/operations may operate on at least some non-corresponding data elements (i.e., those that are not in corresponding relative bit positions within the first and second source operands). Such non-corresponding data elements may be said to be unaligned. In some embodiments, a shift, shuffle, permute, or other data rearrangement operation, may be performed to help align non-corresponding data elements, so that they are in aligned/corresponding relative bit positions in the first and second source operands, so that vertical SIMD operations may be performed on the aligned/corresponding data elements in the first and second source operands by a masked full register access packed data operation used to implement the partial register access instruction/operation. In some embodiments, the data rearrangement operation may be used to align a first operand, or one or more data elements from the first operand, with a second operand, or one or more data elements from the second operand, and/or with a destination operand, or one or more data elements from the destination operand. In some embodiments, the data rearrangement operation may be determined by a decoder upon decoding the partial register access packed data instruction and determining to implement the partial register access packed data instruction through the data rearrangement operation and the masked full register access packed data operation.

Figure 10:
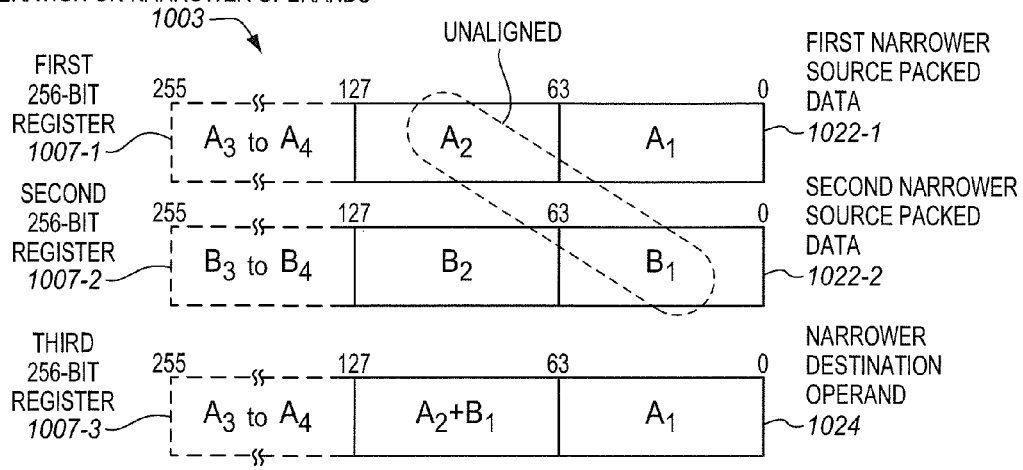
FIG. 10 is a block diagram illustrating a partial register access operation, which may be performed on non-corresponding data elements of narrower operands overlaid on wider operands, in response to a partial register access instruction.
Figure 11:
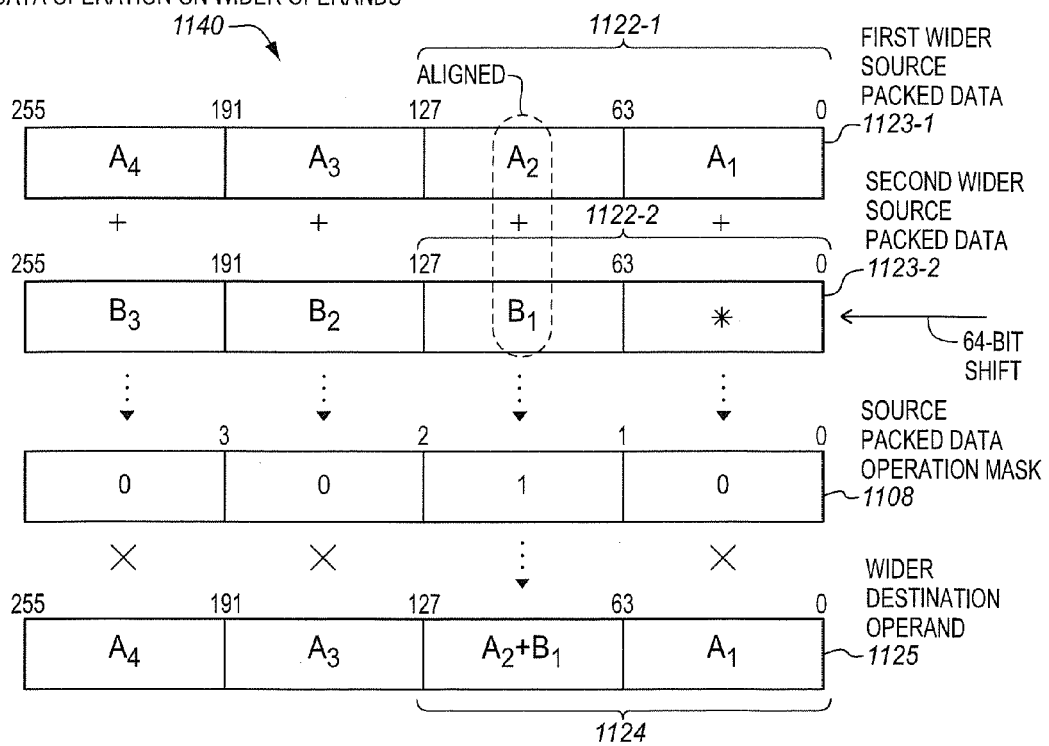
FIG. 11 is a block diagram of an example embodiment of a masked full register access packed data operation, which may be performed on corresponding data elements of wider operands, which may be performed in response to a partial register access packed data instruction indicating operations on non-corresponding data elements of narrower operands.

FIGS. 10 and 11 described below have certain similarities to previously described FIGS. 8 and 9, respectively. To avoid obscuring the description, the discussion below will tend to emphasize the new or different features and/or aspects of FIGS. 10 and 11 without repeating all the features and/or aspects that may optionally be the same or similar. However, it is to be appreciated that the optional features and/or aspects and variations previously described for FIGS. 8 and 9 are generally also applicable to FIGS. 10 and 11, unless otherwise stated, or otherwise clearly apparent.

FIG. 10 is a block diagram illustrating a partial register access operation 1003, which may be performed on non-corresponding and/or unaligned data elements of narrower operands overlaid on wider operands, in response to a partial register access instruction. The partial register access instruction may specify or otherwise indicate a first narrower source packed data 1022-1, a second narrower source packed data 1022-2, and a narrower destination operand 1024. In the illustrated example, each of the first narrower source operand, the second narrower source operand, and the narrower destination operand are 128-bits wide and include two 64-bit data elements, although the scope of the invention is not so limited. In the illustration, the first narrower source packed data has, the values A1 and A2. Similarly, the second narrower source packed data has, the values B1 and B2. The first narrower source packed data 1022-1 is stored in a first wider 256-bit register 1007-1, the second narrower source packed data 1022-2 is stored in a second wider 256-bit register 1007-2, and the narrower destination operand 1024 is stored in a third wider 256-bit register 1007-3. Bits 255:128 of the first wider 256-bit register store values A3 and A4. Similarly, bits 255:128 of the second wider 256-bit register store values B3 and B4.

A result packed data is generated and stored in the narrower destination operand 1024 in response to the instruction/operation. In the illustrated example, the result packed data is 128-bits wide and includes two data elements. A lowest order data element in bits 63:0 includes the value A1 of the corresponding data element from the first source packed data. In this case, no addition operation was performed to generate this data element. A higher order data element in bits 127:64 includes a sum A2+B1. Notice that this is a sum of non-corresponding data elements in the first and second narrower source packed data. In particular, the data element A2 in bits 127:64 of the first narrower source packed data is added to the data element B1 in bits 63:0 of the second narrower source packed data. The data elements A2 and B1 occupy non-corresponding or unaligned bit positions in the first and second source packed data.

FIG. 11 is a block diagram of an example embodiment of a masked full register access packed data operation 1140, which may be performed on corresponding and/or aligned data elements of wider operands, which may be performed in response to a partial register access packed data instruction indicating operations on non-corresponding and/or unaligned data elements of narrower operands. In some embodiments, a processor or a portion thereof (e.g., a decode unit) may map the partial register access packed data instruction to the masked full register access packed data operation in order to replace one or more partial register accesses that would be performed by the partial register access packed data instruction with one or more corresponding full register accesses performed by the masked full register access packed data operation. In some embodiments, the masked full register access packed data operation involving the corresponding and/or aligned data elements of FIG. 11 may be used to implement the partial register access instruction and/or operation involving the non-corresponding and/or unaligned data elements of FIG. 10.

The masked full register access packed data operation may use a first wider source packed data 1123-1 having a first narrower source packed data 1122-1 indicated by the partial register access instruction, and a second wider source packed data 1123-2 having a second narrower source packed data 1122-2 indicated by the partial register access instruction. In the illustrated embodiment, each of the first and second wider source packed data are 256-bits wide and have four 64-bit data elements, and each of the first and second narrower source packed data are 128-bits wide and have two 64-bit data elements, although the scope of the invention is not so limited. In the illustration, the first wider source packed data has the values A1, A2, A3, and A4. The second wider source packed data has the values B1, B2, B3, and B4. In other embodiments, any other appropriate wider and narrower source packed data widths and/or any other appropriate data element widths may optionally be used instead.

In some embodiments, a shift, shuffle, permute, or other data rearrangement operation, may be performed to help align non-corresponding and/or unaligned data elements indicated to be operated on by a partial register access instruction so that they may be operated on in an aligned fashion by a masked full register access packed data operation on wider operands. For example, a shift, shuffle, permute, or other data rearrangement operation may be performed to help align the non-corresponding and/or unaligned data elements A2 and B1 of the partial register access packed data instruction/operation of FIG. 10 prior to the masked full register access packed data operation of FIG. 11. As shown, in the illustrated embodiment, the second wider source packed data 1123-2 may be shifted by 64-bits so that the data element having the value B1 is in bits 127:64 of the second wider source packed data instead of in bits 63:0 of the second wider source packed data. Now, the values A2 and B1 are in corresponding data elements in corresponding bit positions and/or are aligned relative to one another. Advantageously, this may allow a vertical-type SIMD operation (e.g., a packed addition) to be performed. In other embodiments, instead of a shift, other data rearrangement operations may be performed, such as, for example, a rotate, a shuffle, a permute, or various other data rearrangement operations know in the art and suitable for the particular rearrangement needed to achieve alignment.

For some partial register access instructions/operations (e.g., those shown in FIGS. 6 and 8), no alignment or data rearrangement operation may be needed. In some embodiments, if the processor uses such an alignment or data rearrangement operation, then the alignment or data rearrangement operation may be nullified when it is not needed. For example, instead of an actual shift, a shift by zero bits may be performed. As another example, a shuffle or permute operation may shuffle or permute data elements to their original starting positions.

The masked full register access packed data operation may also use a source packed data operation mask 1108. In the illustrated embodiment, since there are four data elements in the destination operand, there are four corresponding mask bits. In this example, the source packed data operation mask has, from the least significant position (on the right), to the most significant position (on the left), the values 0, 1, 0, 0.

A 256-bit result packed data is stored in the wider 256-bit destination operand 1125 in response to the masked full register access packed data operation. In some embodiments, the 256-bit result packed data is stored in the wider destination operand (e.g., a 256-bit register) through a full register write or store. In some embodiments, the 256-bit result packed data and/or the wider destination operand 1125 includes a narrower 128-bit destination operand 1124 indicated by the corresponding partial register access instruction. As shown, only a single sum may be stored in the 256-bit result packed data. Namely, a sum A2+B1 may be stored in bits 127:64 of the destination operand 1125. Only the single mask bit corresponding to bits 127:64 of the destination operand 1125 where the sum A2+B1 is to be stored is set. All other mask bits are cleared. For each of the cleared mask bits, a value of a corresponding data element from the first wider source packed data 1123-1 is stored in the destination operand 1125. In particular, the value A1 is stored in bits 63:0 of the destination operand, the value A3 is stored in bits 191:128 of the destination operand, and the value A4 is stored in bits 255:192 of the destination operand. These other mask bits are masked out since they do not pertain to the single sum A2+B1 according to the original partial register access instruction/operation. Advantageously, these cleared most-significant mask bits may be used to mask out that portion of the wider 256-bit register not needed for the original partial register access instruction (e.g., the instruction/operation of FIG. 10) and allow a full register access instead of a partial register access to be performed. As before, many other arithmetic and/or logical operations besides addition are also/alternatively suitable.

Figures 12, 13:
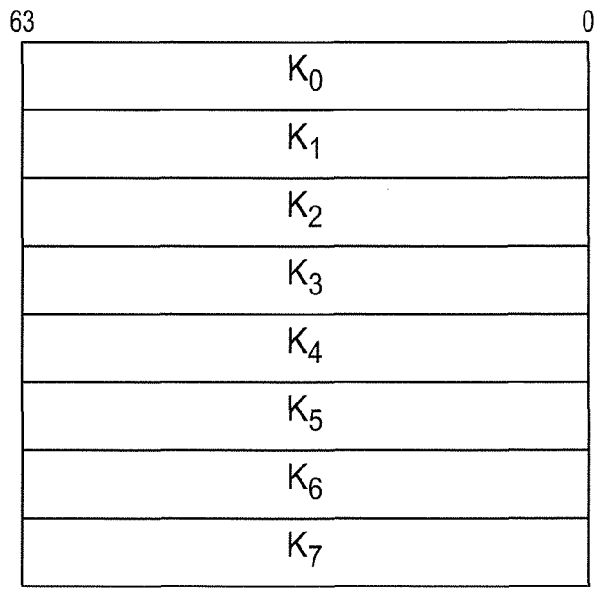
FIG. 12 is a table illustrating that the number of packed data operation mask bits depends upon packed data width and packed data element width.
FIG. 13 is a block diagram of an example embodiment of a suitable set of packed data operation mask registers.

FIG. 12 is a table 1250 illustrating that the number of packed data operation mask bits depends upon the packed data width and the packed data element width. Packed data widths of 128-bits, 256-bits, and 512-bits are shown, although other widths are also possible. Packed data element widths of 8-bit bytes, 16-bit words, 32-bit doublewords (dwords) or single precision floating point, and 64-bit quadwords (Qwords) or double precision floating point are considered, although other widths are also possible. As shown, when the packed data width is 128-bits, 16-bits may be used for masking when the packed data element width is 8-bits, 8-bits may be used for masking when the packed data element width is 16-bits, 4-bits may be used for masking when the packed data element width is 32-bits, and 2-bits may be used for masking when the packed data element width is 64-bits. When the packed data width is 256-bits, 32-bits may be used for masking when the packed data element width is 8-bits, 16-bits may be used for masking when the packed data element width is 16-bits, 8-bits may be used for masking when the packed data element width is 32-bits, and 4-bits may be used for masking when the packed data element width is 64-bits. When the packed data width is 512-bits, 64-bits may be used for masking when the packed data element width is 8-bits, 32-bits may be used for masking when the packed data element width is 16-bits, 16-bits may be used for masking when the packed data element width is 32-bits, and 8-bits may be used for masking when the packed data element width is 64-bits.

FIG. 13 is a block diagram of an example embodiment of a suitable set of packed data operation mask registers 1308. Each of the packed data operation mask registers may be used to store a packed data operation mask. In the illustrated embodiment, the set includes eight packed data operation mask registers labeled k0 through k7. Alternate embodiments may include either fewer than eight (e.g., two, four, seven, etc.) or more than eight (e.g., ten, sixteen, thirty-two, etc.) packed data operation mask registers. In the illustrated embodiment, each of the packed data operation mask registers is 64-bits. In alternate embodiments, the widths of the packed data operation mask registers may be either wider than 64-bits (e.g., 128-bits, etc.) or narrower than 64-bits (e.g., 8-bits, 16-bits, 32-bits, etc). The packed data operation mask registers may be implemented in different ways using well known techniques and are not limited to any known particular type of circuit. In some embodiments, the packed data operation mask registers may be a separate, dedicated set of architectural registers. In some embodiments, the instructions may encode or specify the packed data operation mask registers in bits or a field. By way of example, predicated instruction may use three bits (e.g., a 3-bit field) to encode or specify any one of eight packed data operation mask registers. In alternate embodiments, either fewer or more bits may be used when there are fewer or more packed data operation mask registers, respectively.

Figure 14:
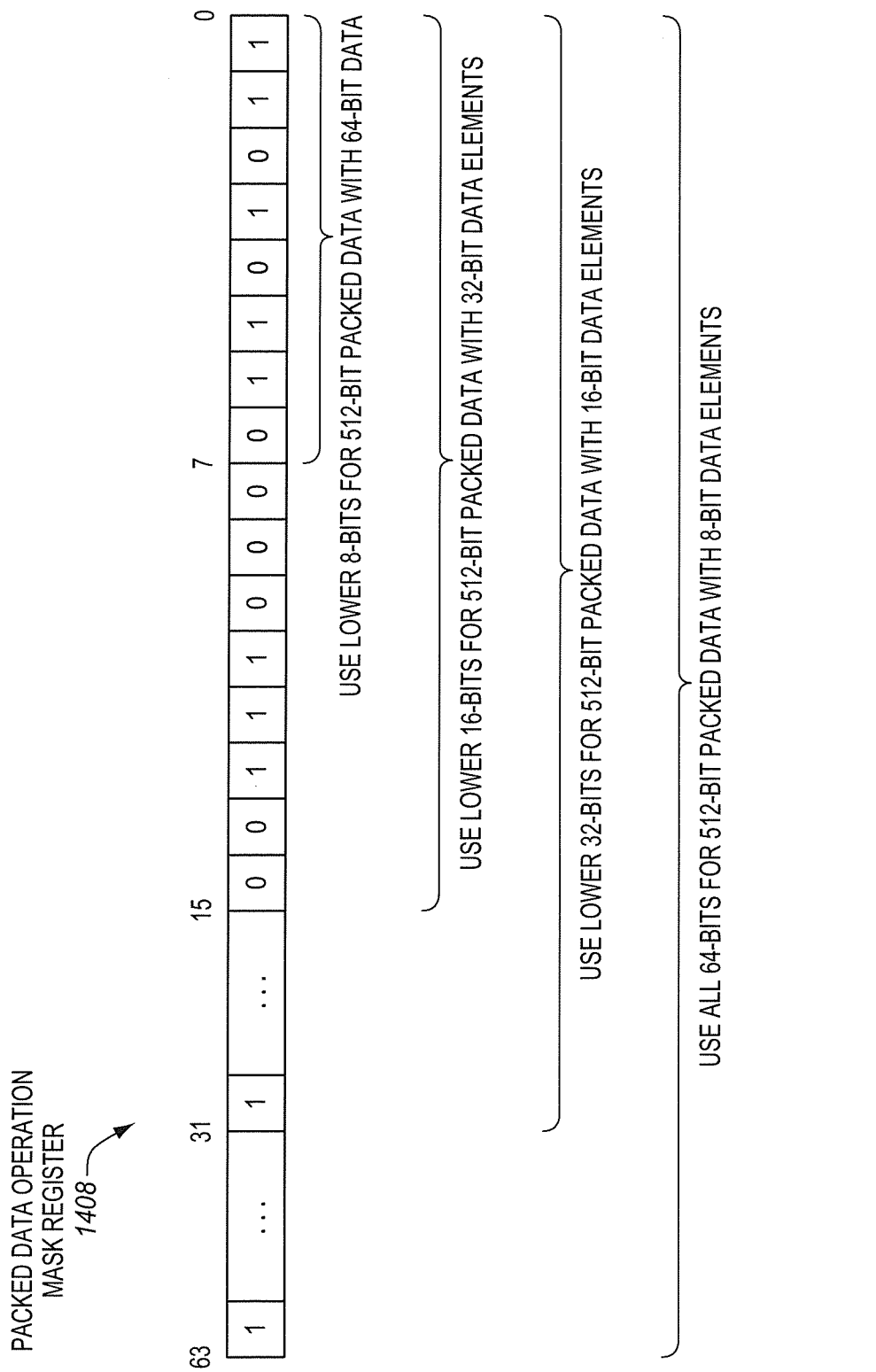
FIG. 14 is a diagram illustrating that a number of bits used as a packed data operation mask and/or for masking may depend on packed data width and data element width.

FIG. 14 is a diagram illustrating an example embodiment of a packed data operation mask register 1408 and showing that the number of bits that are used as a packed data operation mask and/or for masking may depend on packed data width and data element width. The illustrated mask register is 64-bits wide, although this is not required. Depending upon the packed data and data element widths, either all 64-bits, or only a subset of the 64-bits, may be used for masking. Generally, when a single per-element mask bit is used, the number of mask bits used for masking is equal to the packed data width divided by the packed data element width. Several illustrative examples are shown for 512-bit width packed data. Namely, when the packed data width is 512-bits and the data element width is 64-bits, then only 8-bits (e.g., the lowest-order 8-bits) of the register are used for masking. When the packed data width is 512-bits and the data element width is 32-bits, then only 16-bits are used for masking. When the packed data width is 512-bits and the data element width is 16-bits, then only 32-bits are used for masking. When the packed data width is 512-bits and the data element width is 8-bits, then all 64-bits are used for masking. A predicated instruction may access and/or utilize only the subset of bits (e.g., the lowest order or least significant subset of bits) needed for masking based on that instructions associated packed data and data element widths. In the illustrated embodiment, the lowest-order subset or portion of the register is used for masking, although this is not required. In alternate embodiments a highest-order subset, or some other subset, may optionally be used. Moreover, in the illustrated embodiment, only a 512-bit packed data width is considered, however the same principle applies for other packed data widths, such as, for example, 256-bit and 128-bit widths.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the invention. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the invention. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Processor with Integrated Memory Controller and Graphics

Figure 17:
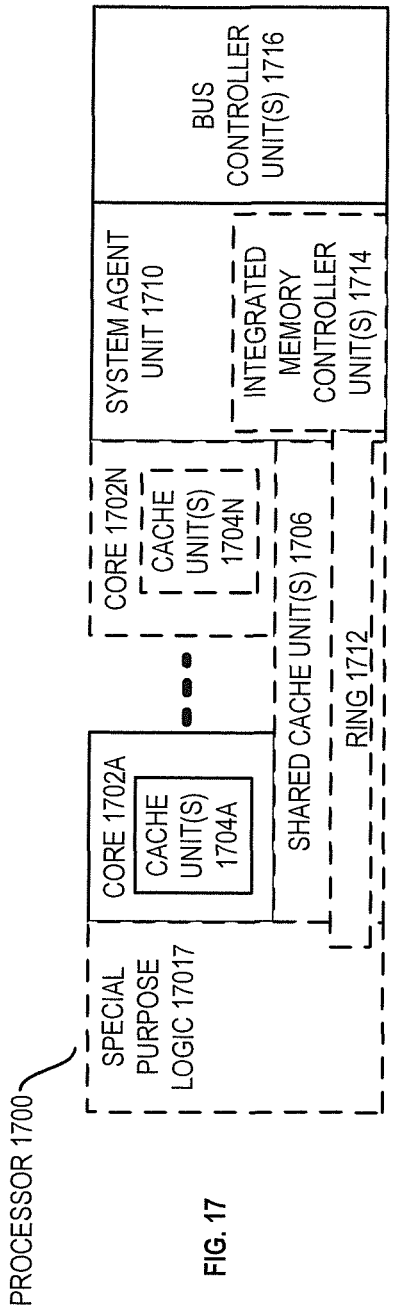
FIG. 17 is a block diagram of a processor that may have more than one core, may have an integrated memory controller, and may have integrated graphics according to embodiments of the invention.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708, the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
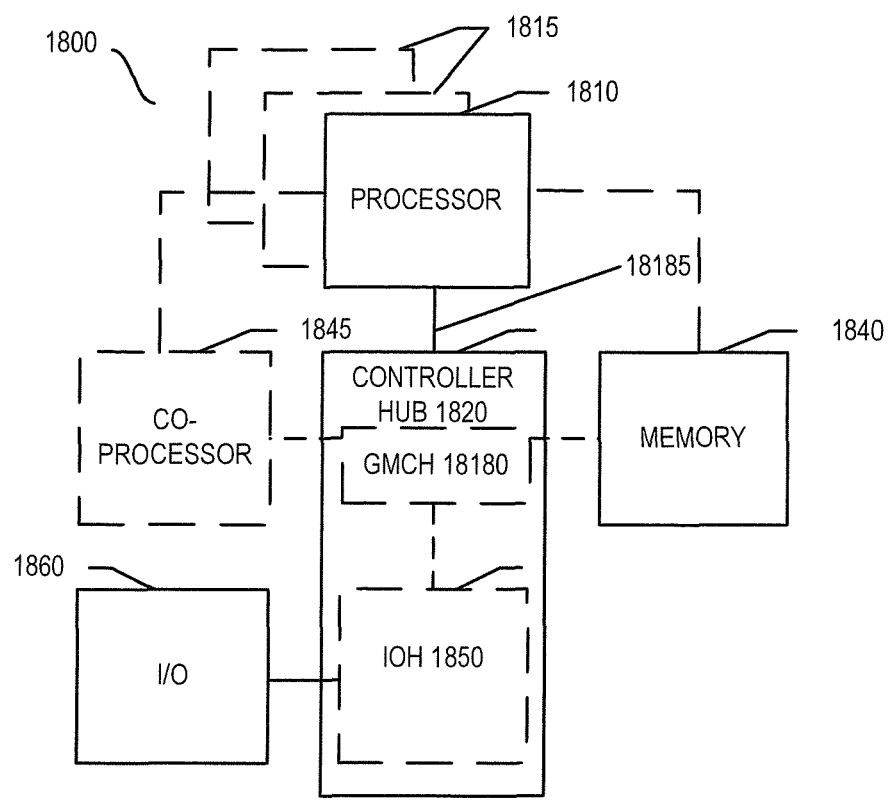
FIG. 18, shown is a block diagram of a system in accordance with one embodiment of the present invention.

Referring now to FIG. 18, shown is a block diagram of a system 1800 in accordance with one embodiment of the present invention. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810,

1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
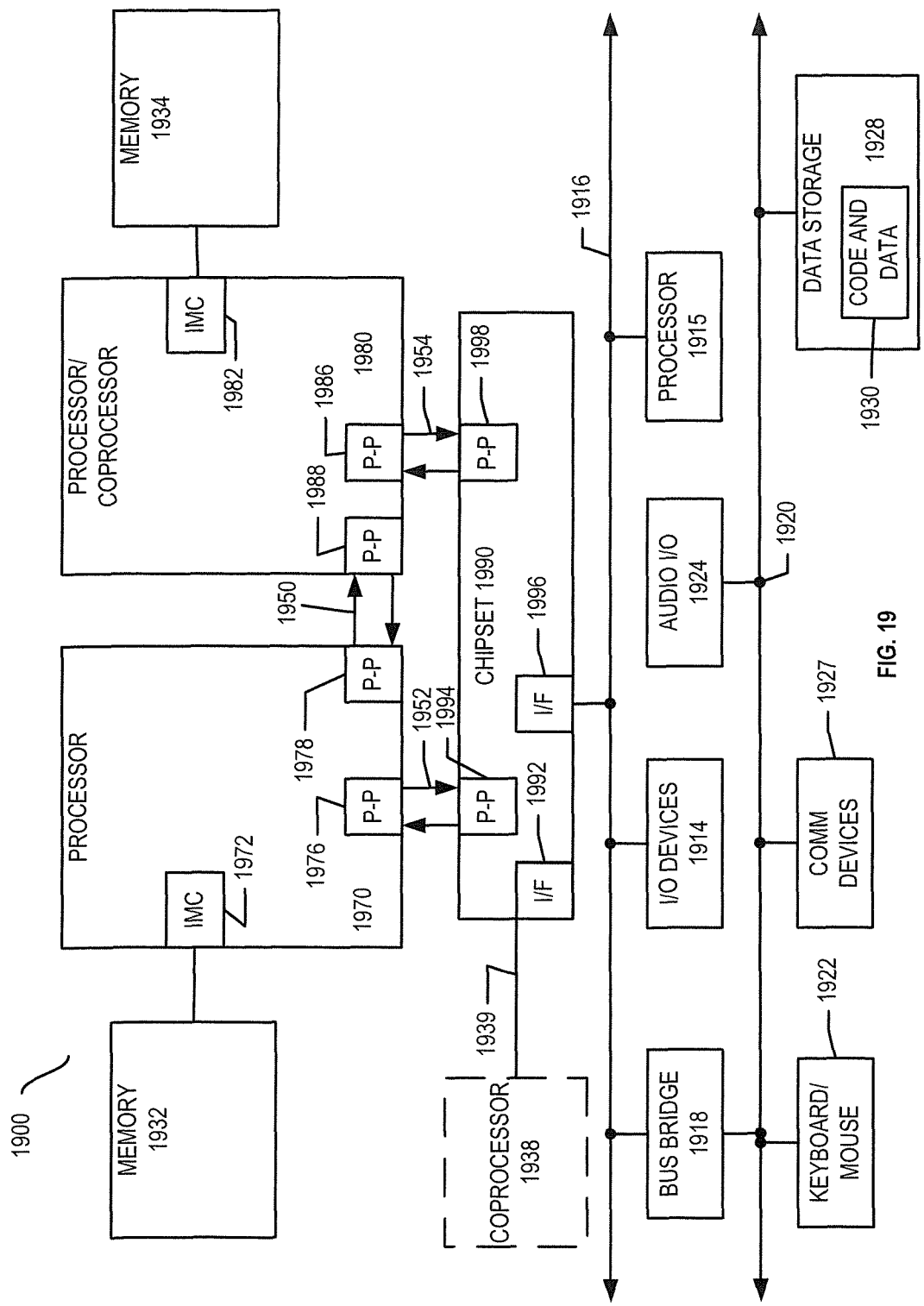
FIG. 19 shown is a block diagram of a first more specific exemplary system in accordance with an embodiment of the present invention.

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
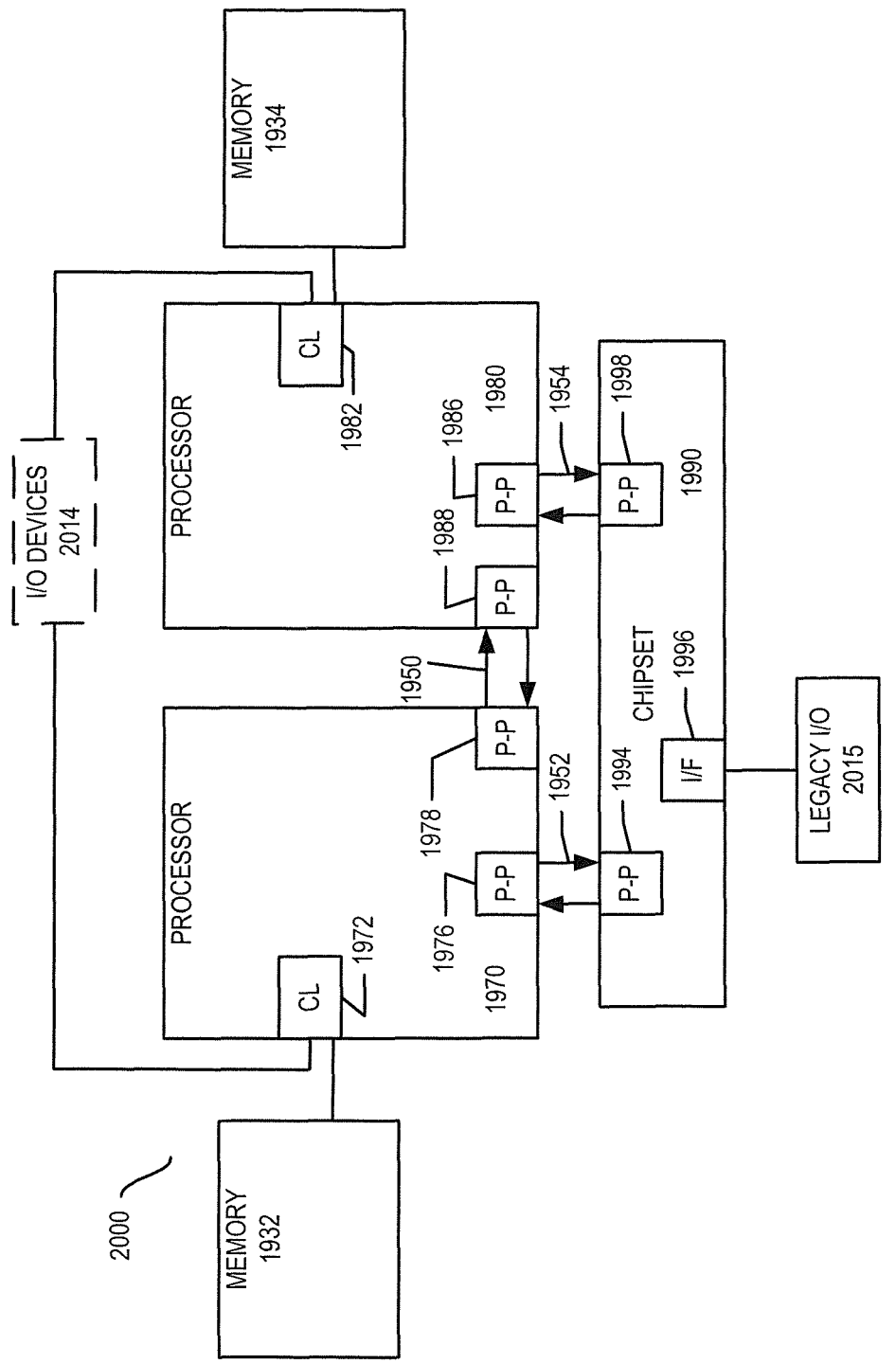
FIG. 20 shown is a block diagram of a second more specific exemplary system in accordance with an embodiment of the present invention.

Referring now to FIG. 20, shown is a block diagram of a second more specific exemplary system 2000 in accordance with an embodiment of the present invention Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic.

FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
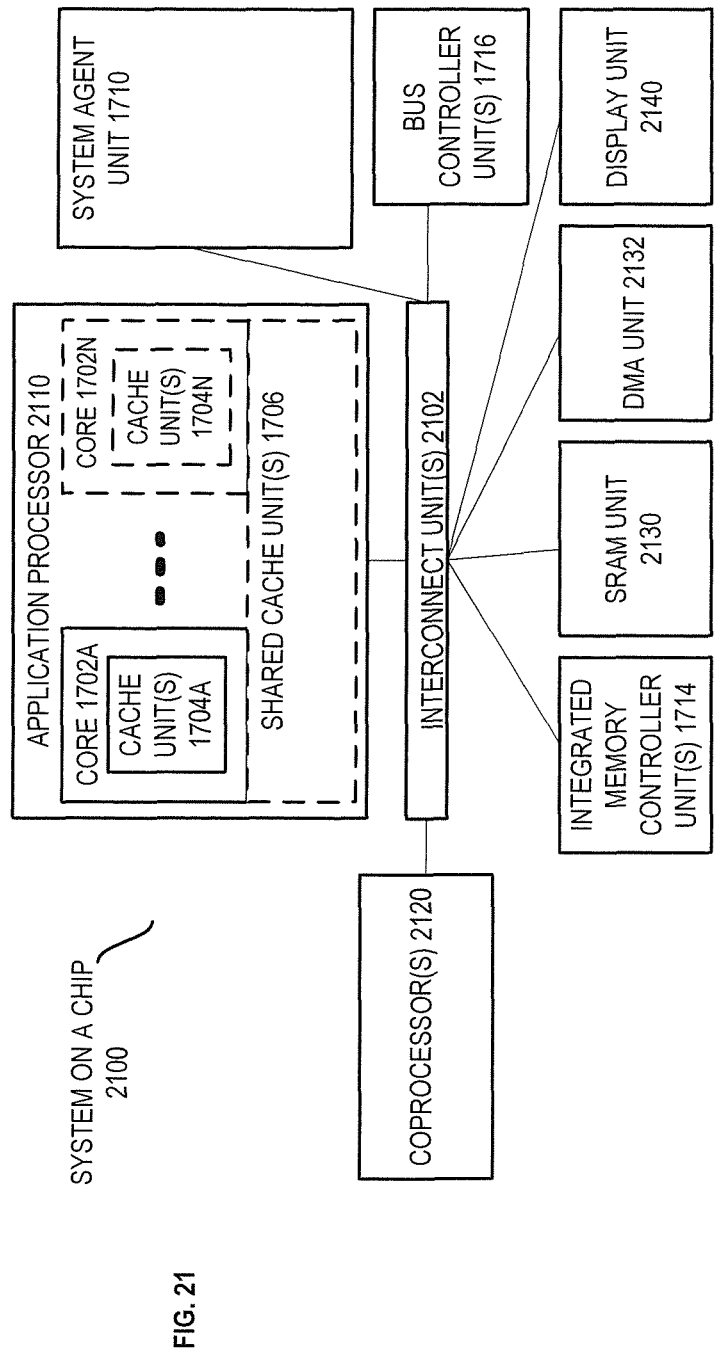
FIG. 21 shown is a block diagram of a SoC in accordance with an embodiment of the present invention.

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 202A-N and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

Components, features, and details described for any of FIGS. 2, 3A, 3B, and 6-14 may also optionally be used in any of FIGS. 4-5. Moreover, components, features, and details described herein for any of the apparatus may also optionally be used in any of the methods described herein, which in embodiments may be performed by and/or with such the apparatus.

Example Embodiments

The following examples pertain to further embodiments. Specifics in the examples may be used anywhere in one or more embodiments.

Example 1 is a processor that includes a decode unit to map a packed data instruction that is to indicate at least a first narrower source packed data operand and a narrower destination operand to a masked packed data operation. The masked packed data operation is to indicate at least a first wider source packed data operand that is to be wider than and is to include the first narrower source packed data operand, and is to indicate a wider destination operand that is to be wider than and is to include the narrower destination operand. The processor also includes an execution unit coupled with the decode unit. The execution unit is to perform the masked packed data operation with a packed data operation mask. The packed data operation mask is to include a mask element for each corresponding result data element of a packed data result that is to be stored by the masked packed data operation. All mask elements that correspond to result data elements to be stored by the masked packed data operation that would not be stored by the packed data instruction are to be masking out. The execution unit is to store the packed data result in the wider destination operand.

Example 2 includes the processor of any preceding example and optionally in which the execution unit is to write an entire width of a register that is to correspond to the wider destination operand, and optionally in which the narrower destination operand is to correspond to only a portion of the width of the register.

Example 3 includes the processor of any preceding example and optionally in which the execution unit is to store the packed data result in which result data elements to be updated by an operation associated with the packed data instruction are to occupy only an intermediate portion of a register between a least significant portion of the register and a most significant portion of the register.

Example 4 includes the processor of any preceding example and optionally in which the decode unit is to receive the packed data instruction that is also to indicate a second narrower source packed data operand, and optionally in which the decode unit is to map the packed data instruction to the masked packed data operation that is also to indicate a second wider source packed data operand that is to be wider than and that is to include the second narrower source packed data operand.

Example 5 includes the processor of any preceding example and optionally in which the decode unit is to receive the packed data instruction that is to indicate an operation on at least one pair of non-corresponding data elements, which are not to be in corresponding bit positions, in the first and second narrower source packed data operands, and optionally in which the processor is further to perform an operation to place the pair of non-corresponding data elements in corresponding bit positions to be operated on by the execution unit when performing the masked packed data operation.

Example 6 includes the processor of any preceding example and optionally in which the processor is to perform the operation to place the pair of non-corresponding data elements in the corresponding bit positions by performing one of a shift operation, a shuffle operation, and a permute operation.

Example 7 includes the processor of any preceding example and optionally in which the packed data instruction is not to indicate a packed data operation mask.

Example 8 includes the processor of any preceding example and optionally in which the packed data instruction is to indicate a packed data operation mask having fewer mask elements than the packed data operation mask that is to be used by the execution unit to perform the masked packed data operation.

Example 9 includes the processor of any preceding example and optionally in which the execution unit is to store the packed data result in which a value of each result data element that corresponds to a masked out mask element is to be unchanged, and optionally in which a value of each result data element that corresponds to an unmasked mask element is to be updated by an operation associated with the packed data instruction.

Example 10 is a method in a processor that includes receiving a packed data instruction indicating at least a first narrower source packed data operand and a narrower destination operand. The method also includes mapping the packed data instruction to a masked packed data operation indicating at least a first wider source packed data operand that is wider than and includes the first narrower source packed data operand, and indicating a wider destination operand that is wider than and includes the narrower destination operand. The method also includes generating a packed data operation mask that includes a mask element for each corresponding result data element of a packed data result to be stored by the masked packed data operation. All mask elements that correspond to result data elements to be stored by the masked packed data operation that would not be stored by the packed data instruction are to be masking out. The method also includes performing the masked packed data operation using the packed data operation mask. The method also includes storing the packed data result in the wider destination operand.

Example 11 includes the method of any preceding example and optionally in which storing the packed data result includes writing an entire width of a register that corresponds to the wider destination operand, and optionally in which the narrower destination operand corresponds to only a portion of the width of the register.

Example 12 includes the method of any preceding example and optionally in which storing includes storing the packed data result in which result data elements which are updated by an operation associated with the packed data instruction occupy only an intermediate portion of a register between a least significant portion of the register and a most significant portion of the register.

Example 13 includes the method of any preceding example and optionally in which receiving includes receiving the packed data instruction that also indicates a second narrower source packed data operand, and optionally in which mapping includes mapping the packed data instruction to the masked packed data operation that also indicates a second wider source packed data operand that is wider than and includes the second narrower source packed data operand.

Example 14 includes the method of any preceding example and optionally in which receiving includes receiving the packed data instruction indicating an operation on at least one pair of non-corresponding data elements, which are not in corresponding bit positions, in the first and second narrower source packed data operands, and optionally further including performing an operation to place the pair of non-corresponding data elements in corresponding bit positions to be operated on by the masked packed data operation.

Example 15 includes the method of any preceding example and optionally in which performing the operation to place the pair of non-corresponding data elements in corresponding bit positions includes performing one of a shift operation, a shuffle operation, and a permute operation.

Example 16 includes the method of any preceding example and optionally in which receiving includes receiving the packed data instruction that does not indicate a packed data operation mask.

Example 17 includes the method of any preceding example and optionally in which receiving includes receiving the packed data instruction that indicates a second packed data operation mask that has a lesser number of mask elements than the generated packed data operation mask.

Example 18 includes the method of any preceding example and optionally in which the first narrower source packed data operand is aliased on the first wider source packed data operand in a register.

Example 19 includes the method of any preceding example and optionally in which storing includes storing the packed data result in which a value of each result data element that corresponds to a masked out mask element is unchanged, and optionally in which a value of each result data element that corresponds to an unmasked mask element is updated by an operation associated with the packed data instruction.

Example 20 is a system to process instructions that includes an interconnect and a processor coupled with the interconnect. The processor includes a first unit to map a packed data instruction that is to indicate at least a first narrower source packed data operand and a narrower destination operand to a masked packed data operation that is to indicate at least a first wider source packed data operand that is to include the first narrower source packed data operand, and that is to indicate a wider destination operand that is to include the narrower destination operand. The processor also includes integrated circuitry coupled with the first unit. The integrated circuitry is to perform the masked packed data operation with a mask that is to include a mask bit for each corresponding data element of a packed data result that is to be stored by the masked packed data operation. Only mask bits that correspond to data elements to be stored by the packed data instruction are allowed to be not masked out. The system also includes a dynamic random access memory (DRAM) coupled with the interconnect.

Example 21 includes the system of Example 20 and optionally in which the integrated circuitry is further to perform a data rearrangement operation to align a data element of the first narrower source packed data operand with a data element of the packed data result.

Example 22 includes a processor that includes means for receiving a packed data instruction indicating at least a first narrower source packed data operand and a narrower destination operand. The processor also includes means for mapping the packed data instruction to a masked packed data operation indicating at least a first wider source packed data operand that is wider than and includes the first narrower source packed data operand, and indicating a wider destination operand that is wider than and includes the narrower destination operand. The processor also includes means for generating a packed data operation mask that includes a mask element for each corresponding result data element of a packed data result to be stored by the masked packed data operation. All mask elements that correspond to result data elements to be stored by the masked packed data operation that would not be stored by the packed data instruction are masking out.

Example 23 includes the system of Example 22 and optionally further including means for aligning a data element of the first narrower source packed data operand with a data element of the packed data result.

Example 24 includes an apparatus to perform the method of any of Examples 10-19.

Example 25 includes an apparatus including means for performing the method of any of Examples 10-19.

Example 26 includes a processor including means for performing the method of any of Examples 10-19.

Example 27 includes computer system including a dynamic random access memory (DRAM) and a processor coupled with the DRAM that includes means for performing the method of any of Examples 10-19.

Example 28 includes an apparatus to perform a method substantially as described herein.

Example 29 includes an apparatus including means for performing a method substantially as described herein.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. In the figures, arrows are used to show connections and couplings.

In the description and claims, the term "logic" may have been used. As used herein, logic may include hardware, firmware, software, or a combination thereof. Examples of logic include integrated circuitry, application specific integrated circuits, analog circuits, digital circuits, programmed logic devices, memory devices including instructions, etc. In some embodiments, the hardware logic may include transistors and/or gates potentially along with other circuitry components.

The term "and/or" may have been used. As used herein, the term "and/or" means one or the other or both (e.g., A and/or B means A or B or both A and B).

In the description above, for purposes of explanation, numerous specific details have been set forth in order to provide a thorough understanding of embodiments of the invention. It will be apparent however, to one skilled in the art, that one or more other embodiments may be practiced without some of these specific details. The particular embodiments described are not provided to limit the invention but to illustrate it through example embodiments. The scope of the invention is not to be determined by the specific examples but only by the claims. In other instances, well-known circuits, structures, devices, and operations have been shown in block diagram form or without detail in order to avoid obscuring the understanding of the description.

Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been described, they may be incorporated into a single component. In other cases, where a single component has been described, it may be partitioned into multiple components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, one or more instructions, that if and/or when executed by a machine are operable to cause the machine to perform and/or result in the machine performing one or operations, methods, or techniques disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In another embodiment, the machine-readable medium may include a transitory machine-readable communication medium, for example, the electrical, optical, acoustical or other forms of propagated signals, such as carrier waves, infrared signals, digital signals, or the like.

Examples of suitable machines include, but are not limited to, general-purpose processors, special-purpose processors, instruction processing apparatus, digital logic circuits, integrated circuits, and the like. Still other examples of suitable machines include computing devices and other electronic devices that incorporate such processors, instruction processing apparatus, digital logic circuits, or integrated circuits. Examples of such computing devices and electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
a decode unit to map a packed data instruction that is to indicate at least a first narrower source packed data architectural register and a narrower destination architectural register to a masked packed data operation that is to indicate at least a first wider source packed data operand that is to be wider than and is to include the first narrower source packed data architectural register, and that is to indicate a wider destination operand that is to be wider than and is to include the narrower destination architectural register; and
an execution unit coupled with the decode unit, the execution unit to perform the masked packed data operation with a packed data operation mask, the packed data operation mask to include a mask element for each corresponding result data element of a packed data result that is to be stored by the masked packed data operation, wherein all mask elements that correspond to result data elements to be stored by the masked packed data operation that would not be stored by the packed data instruction are to be masking out, the execution unit to store the packed data result in the wider destination operand.

2. The processor of claim 1, wherein the execution unit is to write an entire width of a register that is to correspond to the wider destination operand, and wherein the narrower destination architectural register is to correspond to only a portion of the width of the register.

3. The processor of claim 1, wherein the execution unit is to store the packed data result in which result data elements to be updated by an operation associated with the packed data instruction are to occupy only an intermediate portion of a register between a least significant portion of the register and a most significant portion of the register.

4. The processor of claim 1, wherein the decode unit is to receive the packed data instruction that is also to indicate a second narrower source packed data architectural register, and wherein the decode unit is to map the packed data instruction to the masked packed data operation that is also to indicate a second wider source packed data operand that is to be wider than and that is to include the second narrower source packed data architectural register.

5. The processor of claim 4, wherein the decode unit is to receive the packed data instruction that is to indicate an operation on at least one pair of non-corresponding data elements, which are not to be in corresponding bit positions, in the first and second narrower source packed data architectural registers, and wherein the processor is further to perform an operation to place the pair of non-corresponding data elements in corresponding bit positions to be operated on by the execution unit when performing the masked packed data operation.

6. The processor of claim 5, wherein the processor is to perform the operation to place the pair of non-corresponding data elements in the corresponding bit positions by performing one of a shift operation, a shuffle operation, and a permute operation.

7. The processor of claim 1, wherein the packed data instruction is not to indicate the packed data operation mask.

8. The processor of claim 1, wherein the packed data instruction is to indicate a packed data operation mask having fewer mask elements than the packed data operation mask that is to be used by the execution unit to perform the masked packed data operation.

9. The processor of claim 1, wherein the execution unit is to store the packed data result in which a value of each result data element that corresponds to a masked out mask element is to be unchanged, and in which a value of each result data element that corresponds to an unmasked mask element is to be updated by an operation associated with the packed data instruction.

10. The processor of claim 1, further comprising an architectural packed data operation mask register, and wherein the packed data operation mask is to be stored in the architectural packed data operation mask register.

11. The processor of claim 10, wherein the packed data instruction is not to indicate the packed data operation mask and is not to indicate the architectural packed data operation mask register.

12. The processor of claim 1, wherein said all mask elements that correspond to the result data elements to be stored by the masked packed data operation that would not be stored by the packed data instruction are to be masking out and are to have a value of a corresponding data element of the at least one wider source packed data operand.

13. A method in a processor comprising:
receiving a packed data instruction indicating at least a first narrower source packed data architectural register and a narrower destination architectural register;
mapping the packed data instruction to a masked packed data operation indicating at least a first wider source packed data operand that is wider than and includes the first narrower source packed data architectural register, and indicating a wider destination operand that is wider than and includes the narrower destination architectural register;
generating a packed data operation mask that includes a mask element for each corresponding result data element of a packed data result to be stored by the masked packed data operation, wherein all mask elements that correspond to result data elements to be stored by the masked packed data operation that would not be stored by the packed data instruction are masking out;
performing the masked packed data operation using the packed data operation mask; and
storing the packed data result in the wider destination operand.

14. The method of claim 13, wherein storing the packed data result comprises writing an entire width of a register that corresponds to the wider destination operand, and wherein the narrower destination architectural register corresponds to only a portion of the width of the register.

15. The method of claim 13, wherein storing comprises storing the packed data result in which result data elements which are updated by an operation associated with the packed data instruction occupy only an intermediate portion of a register between a least significant portion of the register and a most significant portion of the register.

16. The method of claim 13, wherein receiving comprises receiving the packed data instruction that also indicates a second narrower source packed data architectural register, and wherein mapping includes mapping the packed data instruction to the masked packed data operation that also indicates a second wider source packed data operand that is wider than and includes the second narrower source packed data architectural register.

17. The method of claim 16, wherein receiving comprises receiving the packed data instruction indicating an operation on at least one pair of non-corresponding data elements, which are not in corresponding bit positions, in the first and second narrower source packed data architectural registers, and further comprising performing an operation to place the pair of non-corresponding data elements in corresponding bit positions to be operated on by the masked packed data operation.

18. The method of claim 17, wherein performing the operation to place the pair of non-corresponding data elements in corresponding bit positions comprises performing one of a shift operation, a shuffle operation, and a permute operation.

19. The method of claim 13, wherein receiving comprises receiving the packed data instruction that does not indicate the packed data operation mask.

20. The method of claim 13, wherein receiving comprises receiving the packed data instruction that indicates a second packed data operation mask that has a lesser number of mask elements than the generated packed data operation mask.

21. The method of claim 13, wherein the first narrower source packed data architectural register is aliased on the first wider source packed data operand in a register.

22. The method of claim 13, wherein storing comprises storing the packed data result in which a value of each result data element that corresponds to a masked out mask element is unchanged, and in which a value of each result data element that corresponds to an unmasked mask element is updated by an operation associated with the packed data instruction.

23. A system to process instructions comprising:
an interconnect;
a processor coupled with the interconnect, the processor including:
a first unit to map a packed data instruction that is to indicate at least a first narrower source packed data architectural register and a narrower destination architectural register to a masked packed data operation that is to indicate at least a first wider source packed data operand that is to include the first narrower source packed data architectural register, and that is to indicate a wider destination operand that is to include the narrower destination architectural register; and
integrated circuitry coupled with the first unit, the integrated circuitry to perform the masked packed data operation with a mask that is to include a mask bit for each corresponding data element of a packed data result that is to be stored by the masked packed data operation, wherein only mask bits that correspond to data elements to be stored by the packed data instruction are allowed to be not masked out; and
a dynamic random access memory (DRAM) coupled with the interconnect.

24. The system of claim 23, wherein the integrated circuitry is further to perform a data rearrangement operation to align a data element of the first narrower source packed data architectural register with a data element of the packed data result.

25. A processor comprising:
an architectural packed data operation mask register;
a decode unit to map a packed data instruction that is to indicate at least a first narrower source packed data operand and a narrower destination operand but is not to indicate the architectural packed data operation mask register to a masked packed data operation that is to indicate at least a first wider source packed data operand that is to be wider than and is to include the first narrower source packed data operand, and that is to indicate a wider destination operand that is to be wider than and is to include the narrower destination operand; and
an execution unit coupled with the decode unit, the execution unit to perform the masked packed data operation with a packed data operation mask which is to be stored in the architectural packed data operation mask register, the packed data operation mask to include a mask element for each corresponding result data element of a packed data result that is to be stored by the masked packed data operation, wherein all mask elements that correspond to result data elements to be stored by the masked packed data operation that would not be stored by the packed data instruction are to be masking out, the execution unit to store the packed data result in the wider destination operand.

26. The processor of claim 25, wherein the first narrower source packed data operand is to comprise a first narrower source packed data architectural register, and wherein the narrower destination operand is to comprise a narrower destination architectural register.

\* \* \* \* \*